United States Patent [19]
Timmermans

[11] Patent Number: 5,862,297
[45] Date of Patent: *Jan. 19, 1999

[54] DIGITIZED PICTURE DISPLAY SYSTEM WITH ADDED CONTROL FILES

[75] Inventor: Josef M. K. Timmermans, Hasselt, Belgium

[73] Assignee: U.S. Philips Corporation, New York, N.Y.

[ * ] Notice: The term of this patent shall not extend beyond the expiration date of Pat. No. 5,633,726.

[21] Appl. No.: 702,303

[22] Filed: Aug. 23, 1996

Related U.S. Application Data

[63] Continuation of Ser. No. 983,524, filed as PCT/NL91/00168, Sep. 13, 1991 published as WO92/05652, Apr. 2, 1992.

[30] Foreign Application Priority Data

Sep. 19, 1990 [EP] European Pat. Off. .............. 90202487
Sep. 27, 1990 [NL] Netherlands ........................... 9002110

[51] Int. Cl.$^6$ .................................................. H04N 5/781
[52] U.S. Cl. ........................... 386/70; 358/403; 386/121; 386/126
[58] Field of Search ..................................... 358/403, 444, 358/448, 451, 452, 453; 369/47, 32; 386/45, 46, 95, 125, 126, 70; 395/164, 165, 166; H04N 5/76, 9/79, 5/92

[56] References Cited

U.S. PATENT DOCUMENTS

| 5,218,455 | 6/1993 | Kristy ....................................... 358/403 |
| 5,233,434 | 8/1993 | Furuki et al. .............................. 386/45 |
| 5,241,659 | 8/1993 | Parulski et al. .......................... 386/126 |
| 5,270,831 | 12/1993 | Parulski et al. .......................... 358/403 |
| 5,280,572 | 1/1994 | Case et al. ................................ 386/125 |
| 5,410,415 | 4/1995 | Parulski et al. .......................... 358/403 |
| 5,440,401 | 8/1995 | Parulski et al. .......................... 386/126 |

Primary Examiner—Thai Tran
Attorney, Agent, or Firm—Edward W. Goodman

[57] ABSTRACT

Digitized picture information representing different pictures is stored in respective picture files. Each picture file has both digital picture data and presentation control information including at least orientation information for that picture. Respective additional presentation control information for the different pictures is contained in a separate control file. An apparatus for reading the information, for display on a television set, allows selective use of the presentation control information recorded in the picture file or the corresponding control information in the separate control file.

1 Claim, 13 Drawing Sheets

| IM#1 | IM#3 | IM#5 | IM#30 |
| --- | --- | --- | --- |
| IM#27 | IM#12 | IM#13 | IM#15 |
| IM#16 | IM#18 | IM#20 | IM#21 |
| IM#22 | IM#23 | IM#24 | IM#26 |

DIGITIZED PICTURE DISPLAY SYSTEM WITH ADDED CONTROL FILES

This application is a continuation of Ser. No. 07/983,524, filed as PCT/NL91/00168, Sep. 13, 1991 published as WO92/05652, Apr. 2, 1992.

BACKGROUND OF THE INVENTION

1. Field of the Invention

The present invention relates, in general, to digitized picture data processing systems and is particularly directed to a mechanism for controlling the manner in which digitized pictures are to be accessed from a digital database for presentation by a picture playback device.

Digital imaging systems, such as those employed for converting still color photographic film (e.g., 35 mm) pictures into digital format for storage in a digital database and subsequent playback, as by way of a color television monitor, customarily encode the output of an opto-electronic film scanning device to some prescribed resolution and store the encoded picture in an associated database as a respective picture file. When it is desired to display a particular stored picture, the contents of the respective addresses of the database in which the digitized picture has been stored are read out and coupled to display driver circuitry for energizing corresponding pixels on the TV monitor.

Because each frame of a typical roll of 35 mm film has different horizontal and vertical frame dimensions, for example, a dimension of 36mm in the horizontal direction, parallel to the lengthwise direction of the film, and a dimension of 24 mm in the vertical direction, orthogonal to the lengthwise direction of the film (a horizontal:vertical aspect ratio of 3:2), a photographer often rotates the camera ninety degrees about the lens axis in order to capture a subject in what is conventionally referred to as a "vertical" condition. Since the digitizing mechanism that scans the film strip digitizes each frame as though it contains a "horizontally shot" picture, then, when a "vertically shot" picture is displayed, it will be rotated unless the recording and playback system has been designed to accommodate vertical pictures.

2. Description of the Related Art

One conventional approach to handle the problem, similar to that described in U.S. Pat. No. 4,641,198 to Ohta, is to rotate those film frames which contain vertical pictures by ninety degrees before scanning, and to fill in the left and right sides of the picture with a uniform "border" color (e.g., black). Although this scanning method will provide the proper orientation of the displayed picture, it suffers from two drawbacks. First, the actual scanning mechanism must be modified to effect a rotated scan of the vertical pictures. This is conventionally accomplished by physically reorienting the film by ninety degrees and changing the lens magnification of the scanning device by an amount related to the frame aspect ratio. Secondly, since side borders, which contain no useful information in terms of the captured picture, are also recorded, some of the information storage capacity of the recording medium is wasted. A second solution to the problem is to rotate the display device, which is obviously impractical in many applications.

A third solution is to allow for different picture orientations to be stored, together with digital control data indicative of the orientations of the pictures, and to employ a picture playback device designed to read the orientation control data to properly orient the pictures on playback. Some conventional computer picture file formats, for example, the Tag Picture File Format (TIFF), Revision 5.0, developed jointly by Aldus Corporation, Seattle, Wash., and Microsoft Corporation, Redmond, Wash., and described in "An Aldus/Microsoft Technical Memorandum", Aug. 8, 1988, include the provision for an optional "tag", which can be used to indicate the orientation of the picture. Page 25 of this document describes the TIFF "orientation tag", which can have eight different values, indicating whether the zeroth row and zeroth column of the pixel data matrix represents the top and left, top and right, bottom and right, bottom and left, left and top, right and top, right and bottom, or left and bottom of the visual picture, respectively. However, the Aldus document further states that such a field is recommended for private (noninterchange) use only. The default condition, where the zeroth row represents the visual top of the picture, and the zeroth column of the pixel data matrix represents the visual left hand side of the picture, is recommended for all non-private applications, including those involving importing and printing. Thus, the TIFF orientation tag is never used to re-orient for display, pictures which have been stored in different orientations in a picture database.

In addition to the problem of different picture orientations, captured pictures may have different aspect ratios. For example, dedicated-use panoramic cameras, such as the Kodak Stretch (TM) camera, have an aspect ratio of 3:1 which is considerably wider than the above-referenced 3:2 aspect ratio of conventional 35 mm cameras. Other camera types, such as those which employ 126-type film, also have aspect ratios other than 3:2.

SUMMARY OF THE INVENTION

In accordance with the present invention, advantage is taken of the information storage capability of the database in which the digitized pictures are stored to incorporate an additional presentation control file for each stored picture. This presentation control file contains orientation and aspect ratio information, so that the picture playback device will know how each picture has been stored on the database and will therefore know how to access the stored picture so that it is played back in a proper upright condition.

More particularly, the present invention is directed to an improved storage and retrieval mechanism for a digital picture processing system wherein a plurality of photographic pictures that have been captured on a photographic film strip are digitized for processing and subsequent display. The film strip can be expected to include both horizontally-shot (whether upright or inverted) and vertically-shot (in either a right or left hand rotation) pictures. Digitized pictures are stored on a digital data storage recording medium, such as a compact disc, which is capable of being coupled to a picture playback device for reproduction of a digitized picture on a display such as a color TV monitor.

Pursuant to the present invention, rather than cause a relative physical rotation between film strip and the digitizing scanner, each picture on the film strip is scanned and digitized as though it were horizontally oriented, irrespective of its actual orientation on the film. The digitized picture is entered into a frame store and displayed on a display monitor of a system workstation, so that the picture may be viewed by the operator. Using a workstation input device (e.g., keyboard or mouse), the operator may then enter a set of "presentation" control codes that are incorporated within a presentation control file associated with a respective picture file. These presentation control codes preferably include a first digital code representative of the orientation in which the picture is currently displayed (corresponding to its orientation as digitized from the film strip) and a second digital code representative of its aspect ratio. Once all control information relative to the picture has been defined, both the digitized picture and its presentation control file are written to a portable storage medium, such as a write-once optical disc.

Subsequently, when the disc is inserted into a playback device for driving an output display, such as a color TV monitor, the playback device decodes the presentation control file information in the course of reading out the digitized picture, and uses the presentation control file to control the playback device in such a way as to display the picture in an upright orientation and at the correct aspect ratio for the display. A border generator fills in non-accessed pixel addresses to complete the picture on the display. In addition to responding to presentation control file orientation and aspect ratio codes, the playback apparatus may respond to user-generated control signals for defining the limits of an auxiliary border to be injected onto the displayed picture, so that cropping of selected portions of a picture may be controlled by the user.

DESCRIPTION OF THE PREFERRED EMBODIMENTS

Figure 1A:
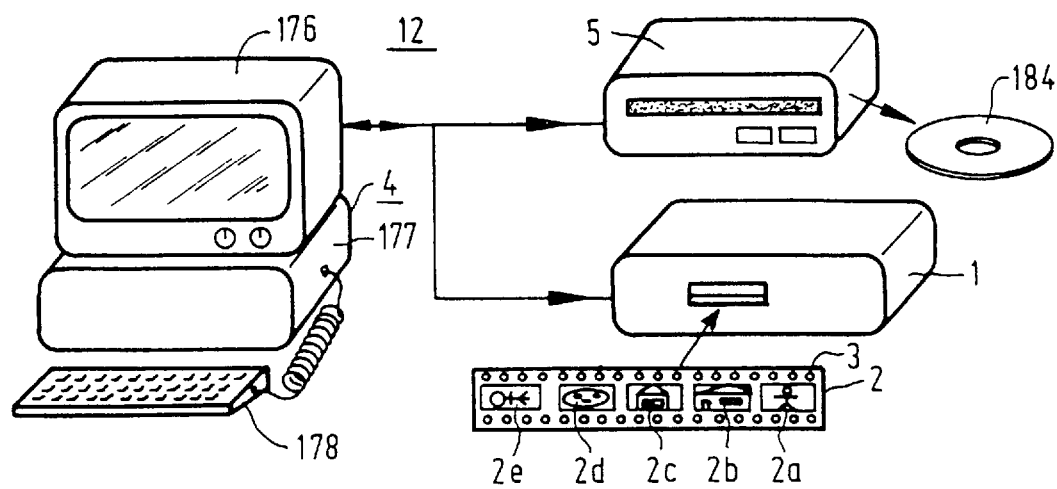
FIGS. 1a, 1b and 1c show a picture-storage system, a picture retrieval and reproduction system, and a simplified picture retrieval and reproduction system, respectively.

FIG. 1a shows a picture storage system 12 in which the invention can be used. The picture storage system 12 comprises a picture scanning unit 1 for scanning pictures on a photographic picture capture medium 3, for example, a 35 mm film strip. The picture scanning device 1 further comprises a picture digitizing unit for digitizing the picture information obtained upon scanning. The digitizing picture information is recorded on a database medium, e.g., a record carrier 184 by means of a recording unit 5 under control of a control unit 4. Prior to recording, the control unit 4 can apply an optional picture processing, for example to enhance, correct or edit the picture representation defined by the digitized picture information. For this purpose, the control unit may comprise picture processing means which are known per se. The recording unit 5 may comprise, for example, an optical, a magnetic or a magneto-optical recording device. In view of the high storage capacity of optical and magneto-optical record carriers it is preferred to use an optical or a magneto-optical recording device. The control unit 4 may comprise a computer system, for example, a so-called "personal computer" or a so-called work station with suitable hardware and application software.

Figure 1B:
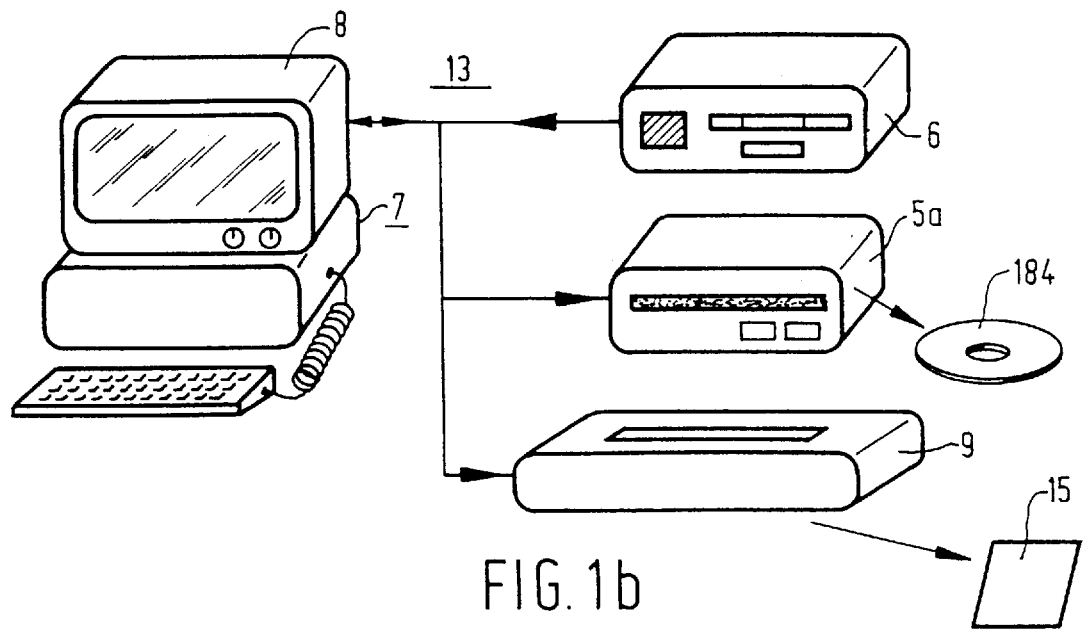

FIG. 1b shows a picture retrieval and reproduction system for retrieving and displaying representations of digitized pictures stored on the record carrier 184 by means of the picture storage system 12. The picture retrieval and reproduction system 13 comprises a read unit 6 for locating and reading out selected digitized pictures under control of a control unit 7. Representations of digitized pictures thus read can be made visible on a picture reproduction unit. Such a picture reproduction unit may comprise a display screen 8, which, for example, forms part of the control unit 7, or an electronic picture printer 9 for generating a hard copy 15 of a representation of the read-out digitized picture. The picture retrieval and reproduction system 13 may further comprise an additional recording device 5a, by means of which the digitized picture information, read by means of the read device 6, may be recorded on a record carrier 184 after an optional picture processing operation is performed by the control unit 7 for the purpose of enhancement, correction or editing. The control unit 7 in the picture retrieval and reproduction system 13 may comprise a computer system, for example, a "personal computer", or a work station with suitable hardware and application software. Although such a system is very suitable for the control task to be performed and the optional picture processing, it has the drawback that it is comparatively expensive.

In general, it is desirable to have such an expensive computer system for the control unit in conjunction with the electronic picture printer 9 because of the complexity of the control and picture processing functions. However, if it is merely desired to display selected digitized pictures on a display screen, the computing capacity and storage capacity of a computer system in the form of a personal computer or work station are high in comparison with the control functions to be performed. In that case, it is preferred to employ a simplified control unit with a limited computing and storage capacity and a limited data processing speed. The system as shown comprises a digitized picture playback device, which includes the read unit 6, and a picture processing unit which converts the digitized picture read by the read unit 6 into a picture signal which is suitable for the reproduction unit (display screen 8 or printer 9). This picture processing unit may be comprised partly or completely into the read unit 6, the control unit 7 or the picture reproduction units 8 or 9.

Figure 1C:
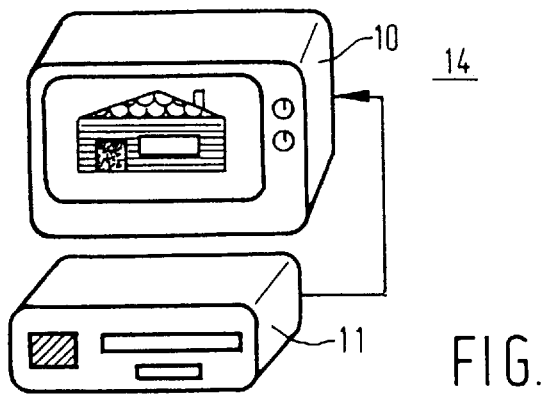

FIG. 1c shows a simplified picture retrieval and reproduction system 14. This simplified system 14 comprises a display unit 10 and a picture retrieval and a digitized picture playback device 11 comprising the read unit 6. A control unit for controlling the retrieval and read operation and, if applicable, a limited picture processing can be accommodated in one of the units 10 and 11, but suitably in the unit 11. When the control unit is accommodated in the retrieval and read unit 11 it is possible to employ, amongst others, a standard TV set or monitor unit for the picture display device.

This is an advantage, in particular for consumer uses because the consumer then merely has to purchase the retrieval and read device to display the representations of the pictures.

As a result of their comparatively high cost, the picture storage system 12 shown in FIG. 1a and the picture retrieval and reproduction system 13 shown in FIG. 1b are particularly suitable for central uses, for example, in photo processing laboratories or photo finishing mini-labs.

Figure 2:
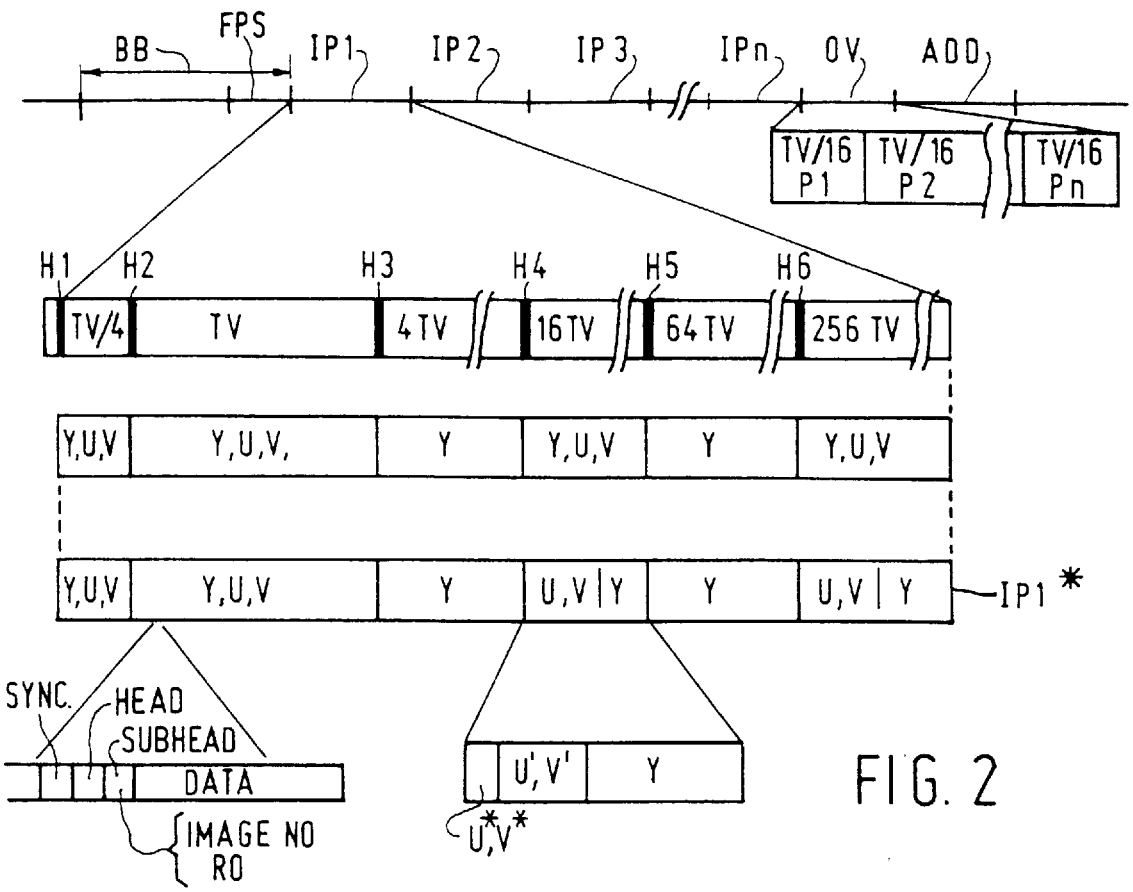
FIG. 2 shows a suitable format for recording picture information on a record carrier.

For recording digitizing picture information, it is preferred to record the information on the record carrier in a predetermined format and order. FIG. 2 shows a suitable format and order, in which files containing coded picture information bear the references IP1, . . . IPn. Hereinafter, the files IP1, . . . , IPn will be referred to as picture files. Moreover, a plurality of control files BB have been recorded. These files contain, inter alia, read-out control data which is used for controlling the read-out of the digitized picture information and picture parameter data, for the purpose of performing optional picture processing operations on the picture information read and for the purpose of displaying representations of the digitized picture information. It is to be noted that the picture parameter data may be included in the picture files. The advantage of this is that the required picture parameter data becomes available at the instant at which it is needed, i.e., at the instant at which the picture file is read.

Apart from the picture files IP1–IPn and the associated control files BB, it may be desirable, in a number of cases, to record files with additional information, for example, audio information or text information. Such audio and/or text information may relate to, for example, digitized picture information and can then be reproduced or displayed when the representations of the relevant digitized picture information are displayed. The files with additional information are referenced ADD and may be recorded, for example, after the coded picture information.

For every digitized picture stored, the picture files contain a plurality of subfiles which each define a representation of the same scanned picture, the resolutions of the representations defined by these coded pictures being different. In FIG. 2, the different subfiles for the picture file IP1 bear the references TV/4, TV, 4TV, 16TV, 64TV, 256TV. The subfile TV defines a representation of the scanned picture with a resolution corresponding substantially to a standard NTSC or PAL TV picture. Such a picture may comprise, for example, 512 lines of 768 pixels each. The subfile TV/4 represents the scanned picture with a resolution which, in the horizontal and the vertical directions, has been reduced linearly by a factor of 2 relative to the resolution of the picture represented by the subfile TV. The subfiles 4TV, 16TV, 64TV and 256 TV define picture representations whose horizontal and vertical resolution has been increased linearly by a factor of 2, 4, 8 and 16, respectively. Preferably, the subfiles are arranged in such a way that the resolutions of the representations defined by the successive digitized pictures increase (linearly) in steps of 2. During reproduction, when the consecutive subfiles are generally read successively, it is then simple to first display a representation of a picture of low resolution and, subsequently, to replace this representation wholly or partly by representations of the same picture of each time increasing resolution. This has the advantage that the waiting time before a picture representation appears on the display screen is minimized. Indeed, on account of the limited amount of information needed for this, the read-out time of a digitized picture defining a low-resolution representation is short in comparison with the read-out time of encoded pictures defining higher-resolution representations.

A generally known representation of pictures is that in which the picture is composed of a matrix of small areas of constant luminance value and/or constant color value. In this representation, it is customary to select the areas of constant color value to be larger than the areas of constant luminance value.

An area of constant color value will be referred to hereinafter as a color pixel and an area of constant luminance value will be referred to hereinafter as a luminance pixel. A row of color pixels of a width equal to the full picture width will be referred to hereinafter as a color picture line. A row of luminance pixels of a width equal to the full picture width will be referred to hereinafter as a luminance picture line. A picture represented by luminance picture lines and color picture lines can be defined simply by a digitized picture by assigning to each luminance pixel and color pixel, a digital code specifying the relevant luminance value and color values. These digital codes will be referred hereinafter as digitized pixels.

Figure 3:
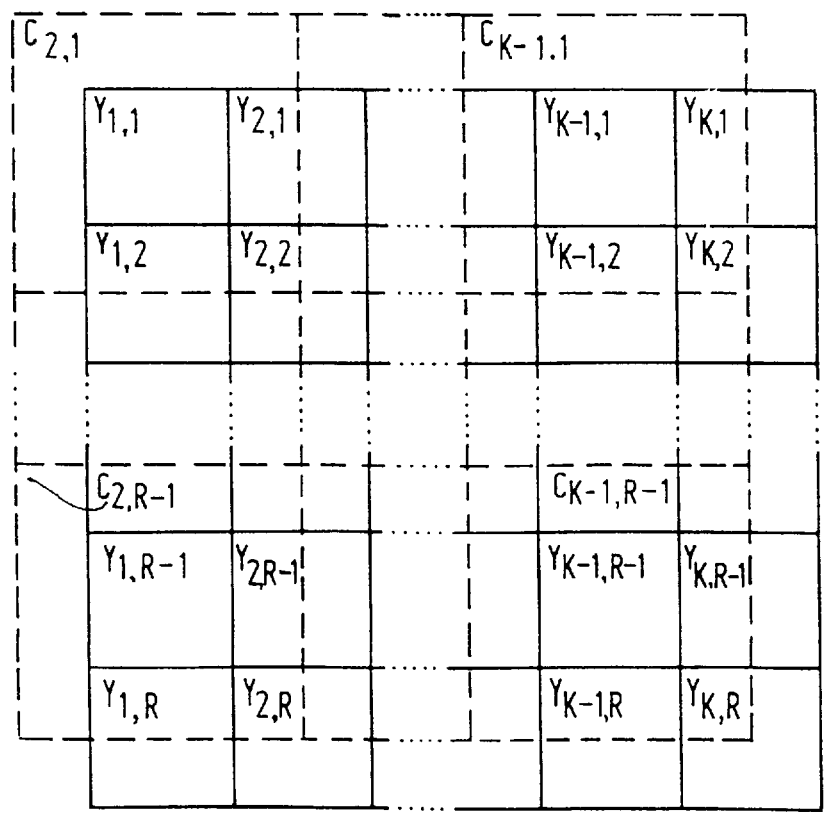
FIG. 3 illustrates a suitable method for digitizing the picture information.

FIG. 3, by way of illustration, shows the structure of a picture of color pixels and luminance pixels. The luminance pixels bear the reference signs ($Y_{2,1}$; . . . ; $Y_{K-1,R-1}$). The color pixels bear the reference signs ($C_{1,1}$; . . . ; $C_{K,R}$). It is to be noted that in FIG. 3, as is customary, the dimensions of the color pixels in the horizontal and the vertical direction is twice as large as the dimensions of the luminance pixels. This means that the resolution of the color information in the horizontal and the vertical direction is a factor of two lower than the resolution of the luminance information.

A suitable picture coding is that in which a digital code or digital codes is/are assigned to every luminance pixel and every color pixel, the code(s) defining the absolute value of the luminance component Y and the absolute values of the color-difference components U and V, respectively. Such a coding will be referred to hereinafter as an absolute picture coding. The digitized pictures achieved by absolute picture coding will be referred hereinafter as absolutely coded pictures. Preferably, representations of a number of low-resolution pictures are recorded as absolutely coded pictures. This enables the picture information to be recovered in a simple manner. This is particularly advantageous for the simplified picture retrieval and reproduction system 14, because this enables the price of such a system, which is intended for the consumer market, to be kept low by the use of simple picture decoding systems.

The use of a picture file with a number of absolutely coded pictures of different resolutions simplifies the reproduction of representations of composite pictures, where a representation of a small low-resolution picture is displayed within the outline of a representation of a higher-resolution picture. The reproduction of such a representation of a composite picture is referred to as "Picture in Picture" ("PIP"). Moreover, recording a plurality of absolutely coded pictures defining representations of the same picture with different resolutions simplifies the reproduction of enlarged representations of details of a digitized picture. Such a function is also referred to as the TELE-function (or ZOOM-function). The availability of absolutely coded pictures with different resolutions implies that for some of the TELE functions and PIP functions, the required picture information is directly available and need not be derived by means of additional picture processing operations to be performed by complex circuits.

In the recording of picture information, it is customary to record the digitized pixels in rows (or lines) or sometimes in columns. Recording in lines is to be preferred because in the customarily used picture display units, the picture information should be presented in the form of lines.

For high resolutions, the storage of absolutely coded picture information has the drawback that the amount of information to be recorded is very large. For such high-resolution pictures, a residual coding is very suitable. In such a residual coding, differences between the signal value of the pixels of the high-resolution picture and the signal value of the corresponding part of the lower-resolution picture are determined and subsequently encoded.

Figure 4:
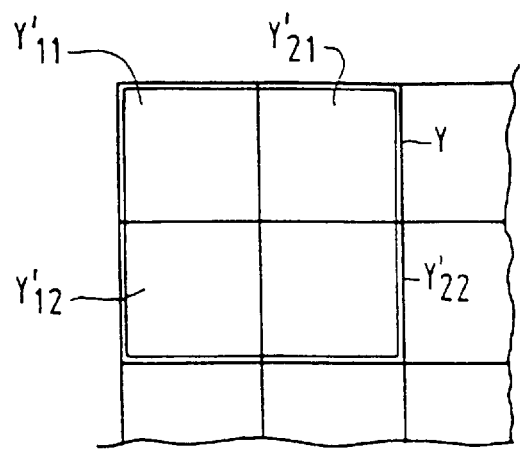
FIG. 4 illustrates a suitable residual coding to be used for in digitizing picture information.
Figure 5:
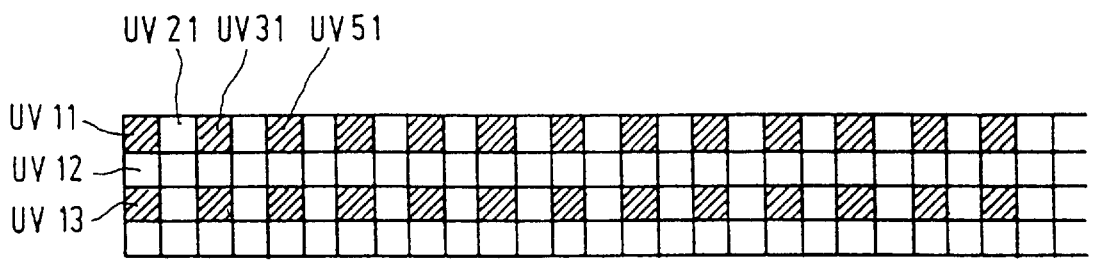
FIG. 5 illustrates a suitable arrangement of the color information of a picture for a series of digitized pictures of increasing resolutions.

To illustrate this coding method, FIG. 4 shows one luminance pixel Y of a low-resolution picture and four luminance pixels $Y_{1,1}'$; $Y_{2,1}'$; $Y_{1,2}'$ and $Y_{2,2}'$ of the corresponding higher-resolution picture in the case that the horizontal and the vertical resolution is increased by a factor of 2. Instead of the absolute luminance value of the luminance pixels $Y_{1,1}'$, . . . , $Y_{2,2}'$, the residual coding encodes differences (hereinafter referred to as residual values) between the luminance values of the luminance pixels $Y_{1,1}'$, . . . , $Y_{2,2}'$ and the luminance pixel Y. In this way the residual values of a complete picture can be determined both for the luminance and for the color information. As the number of residual values equal to zero or being very small is large in comparison with the number of large residual values, a substantial data compression can be obtained by applying an additional coding in which the residual values are non-linearly quantized and are subsequently subjected to, for example, a Huffman coding. A digitized picture achieved by the above residual coding will be referred hereinafter as residually coded picture.

A residually coded picture can be used as a basis for a new residual coding for a picture with further increased resolutions. Thus, by recording one absolutely coded low-resolution picture and a series of residually coded pictures of increasing resolutions in compressed form it is possible to record a plurality of digitized pictures defining representations of the same picture with increasing resolutions. In the picture file IP1 shown in FIG. 2 the pictures in the subfiles TV/4 and TV are absolutely coded and the pictures in the subfiles 4Tv, 16TV, 64TV and 256TV are residually coded, with non-linear quantization and Huffman coding.

The color information is also coded residually in a way similar to the luminance information. However, the horizontal and the vertical resolution of the consecutive residually coded color information increases by a factor of four instead of by a factor of two as with the luminance information. This means that a picture file containing only residually coded luminance information and no color information (4TV and 64TV) alternates with a picture file containing both residually coded luminance information and residually coded color information (16TV and 256TV), see FIG. 2. Leaving out the color information in the subfiles 4TV and 64TV reduces the required storage capacity and the access time to the coded picture information in the picture file. However, the absence of the color information in the subfiles 4TV and 64TV need not adversely affect the picture quality during reproduction. This is because during the reproduction of a representation of a digitized picture for which no color information has been recorded, the color information of the next coded picture defining a representation of higher resolution, or the color information of the preceding coded picture defining a representation of lower resolution can be utilized. In order to reduce the total access time to the required picture information, it is to be preferred to record the color information U, V in the subfiles 16TV and 256TV contiguously to the luminance information Y in the subfiles 4TV and 64TV, as is illustrated for the file IP\* in FIG. 2.

As already stated, it is customary to record the digitized pixels line by line.

The stored digitized pictures generally define a number of pictures with a "horizontal" orientation or landscape format (i.e., for a faithful reproduction, the picture should be displayed in an orientation in which the width of the picture is larger than the height of the picture) and a number of pictures with "vertical" orientation or portrait format (i.e., for a faithful reproduction, the picture should be displayed in an orientation in which the height of the picture is larger than the width of the picture).

By way of illustration, FIG. 1 shows a picture capture medium 3 with some pictures in landscape format (2a, 2b, 2c and 2d) and one picture in portrait format (2e). On the record carrier, all the digitized pictures are recorded as though they were representations of pictures in landscape format. This is in order to enable a uniform picture scanning to be used without the necessity to detect whether the scanned picture is of the landscape or portrait type and to change over the scanning and/or picture processing depending upon the detection result. However, this means that during reproduction, the representations of portrait format pictures will be displayed with an incorrect orientation. This can be precluded by providing a possibility to assign a orientation code to the recorded coded pictures, which code indicates the orientation of the scanned picture. This code can be used to determine whether the representation should be rotated during reproduction and, if this is the case, whether the representation should be rotated through an angle of 90, 180 or 270 degrees. This orientation code can be included in every picture file IP1, . . . , IPn. It is also possible to record these orientation codes in the control file BB or to store these orientation codes in a non-volatile memory arranged in the read unit or connected to this unit.

During reproduction, it is then possible to determine, on the basis of the orientation code, whether the representation to be displayed should be rotated and, if this is the case, a rotation through the desired angle can be performed prior to reproduction. A drawback of including the orientation codes in the picture files IP is that these rotation codes have to be determined already during scanning of the pictures. In practice, this means that an operator of the picture storage system should determine for each scanned picture whether the stored picture is to be rotated during reproduction, because the known auxiliary devices are not always capable of detecting whether a scanned picture is of landscape or portrait format and whether the picture is presented to the scanning unit with the correct orientation. This is undesirable in particular because it implies that an operator must be present during recording, which makes it difficult to realize a fully automated picture storage system 12.

Figure 6:
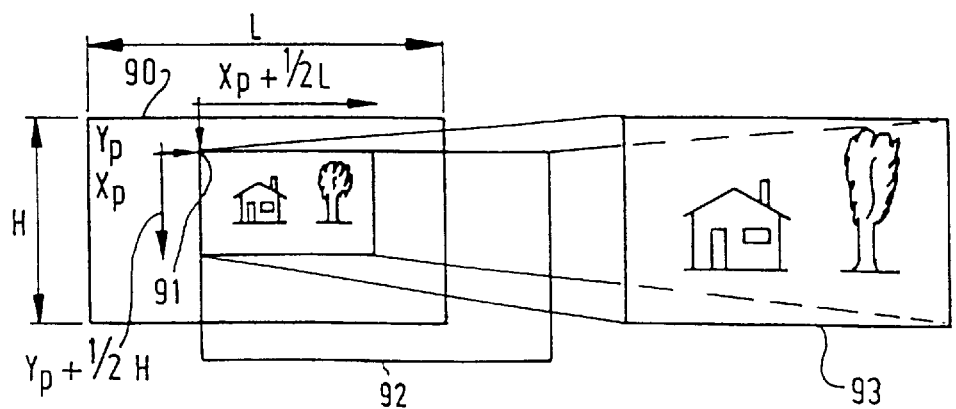
FIG. 6 illustrates an example of a picture processing function.

If the orientation codes are already available during recording of the digitized picture information, it will be advantageous to record these codes on the record carrier. In the case of the file organization shown in FIG. 2, a suitable position for recording the rotation codes is the subfile FPS of the control file BB. For reasons of user convenience, it is desirable to specify, apart from the required rotation, whether instead of a representation of stored coded pictures, a representation which is slightly shifted (to the left, right, top or bottom) should be displayed. This is certainly desirable if the display area, within which the representation is to be displayed in a display unit, is smaller than the dimensions of the representations, because it is possible that an important detail of the picture falls outside the display area. The desired shift can be specified by assigning a translation code to every digitized picture. In FIG. 6, a suitable translation coding for a picture 90 is defined by means of the coordinates Xp and Yp of a vertex 91 of a portion of the picture 90 to be displayed after translation. By means of a translation code and a magnification code, it is possible to specify the magnification factor with which a certain part of the original picture is to be displayed. The reference numeral 93 indicates an enlarged representation of a part of the picture 90, defined by a translation Xp, Yp and a magnification factor of 2. In addition to the above data, it is also possible to include other picture parameter data in the subfile FPS of the control file BB, such as, for example, parameters specifying a color or luminance adaptation and other picture processing operations to be applied before a representation of the coded picture is displayed. Moreover, it is advantageous to store the desired sequence in which the pictures must be reproduced in the subfile FPS within the control file BB.

A collection of picture parameter data defining the preferred sequence as well as all the desired picture parameter data for all the coded pictures on a record carrier will be referred to hereinafter as a set of picture parameter data. It may be advantageous to record more than one set of picture parameters data in the file FPS. This enables a different display sequence and other picture processing operations to be selected by different persons, for example, persons within a family. It also allows a user to make a choice from different sets of picture parameter data. It is to be noted that when a record carrier of the write-once type is used, the sets of picture parameter data can be recorded on the record carrier only if they are available during recording. This requires human intervention during recording. During reading of the record carrier, a set of picture parameter data is selected and the representations of the coded pictures can be displayed in conformity with the selected set of picture parameter data.

Figure 7:
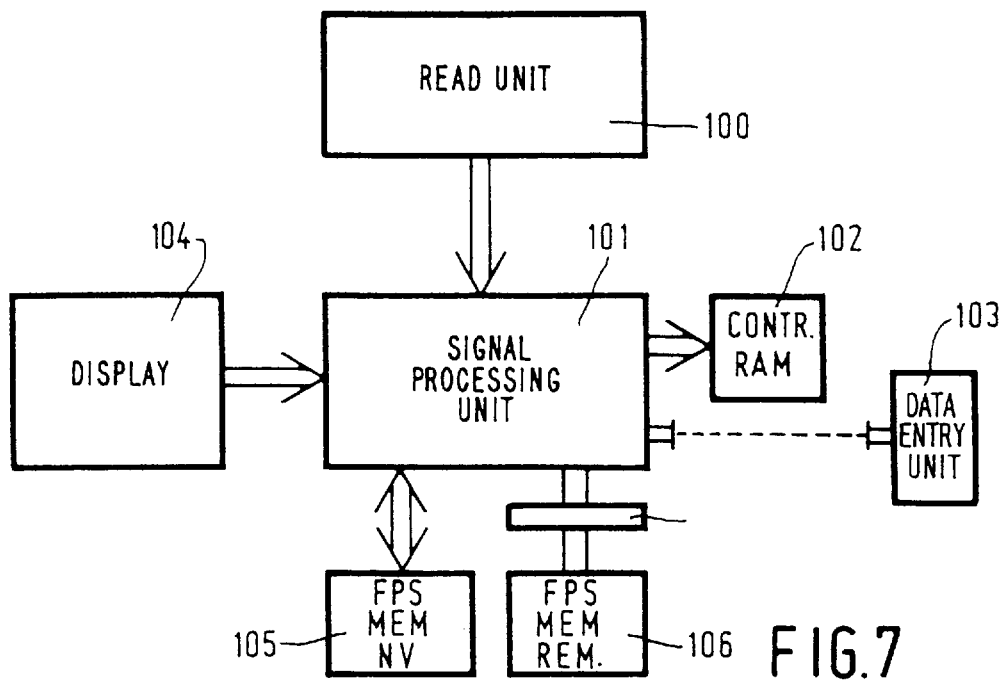
FIG. 7 shows an embodiment of a retrieval and reproduction system capable of displaying picture information in accordance with picture parameter data.

FIG. 7 is a block diagram of an embodiment of a picture retrieval and display system by means of which representations of coded pictures can be displayed in conformity with a selected set of picture parameter data. In this diagram, the reference numeral 100 refers to a read unit for reading the record carrier. For the purpose of applying the information being read, the read unit 100 is coupled to a control and signal processing unit 101. From the information received from the read device 100, the unit 101 selects the file FPS containing the set(s) of picture parameter data and stores this (these) set(s) in a control memory 102. By means of a data entry unit 103, for example, a remote control device, a user can select a set from the control memory 102 and can subsequently activate the unit 101 to start the read cycle, in which the digitized picture information is read in the sequence specified by the selected set of picture parameter data under control of the unit 101. After the digitized picture information has been read out, this information is processed in accordance with the selected set of picture parameter data and is applied to a display unit 104.

It may occur that after some time, the picture parameter data stored on the record carrier are no longer entirely in compliance with the user's wishes, or that no or incorrect picture parameter data have been recorded on the record carrier. This is problematic in particular if the record carrier is of a type which cannot be overwritten, because the recorded picture parameter data then cannot be adapted. This problem can be mitigated by providing the retrieval and display system in FIG. 7 with a digital database medium, e.g., a non-volatile memory 105, in which, together with a record carrier identification code, a new set of picture parameter data or information about the desired changes of the picture parameter data relative to the set of picture parameter data recorded on the record carrier is stored for the record carrier specified by means of the record carrier identification code. In view of the limited storage capacity of the non-volatile memory 105, it is desirable to record the information necessary for the picture parameter data in a most compact form, for which reason it is preferred to record the information about the changes of the picture parameter data.

Figure 8:
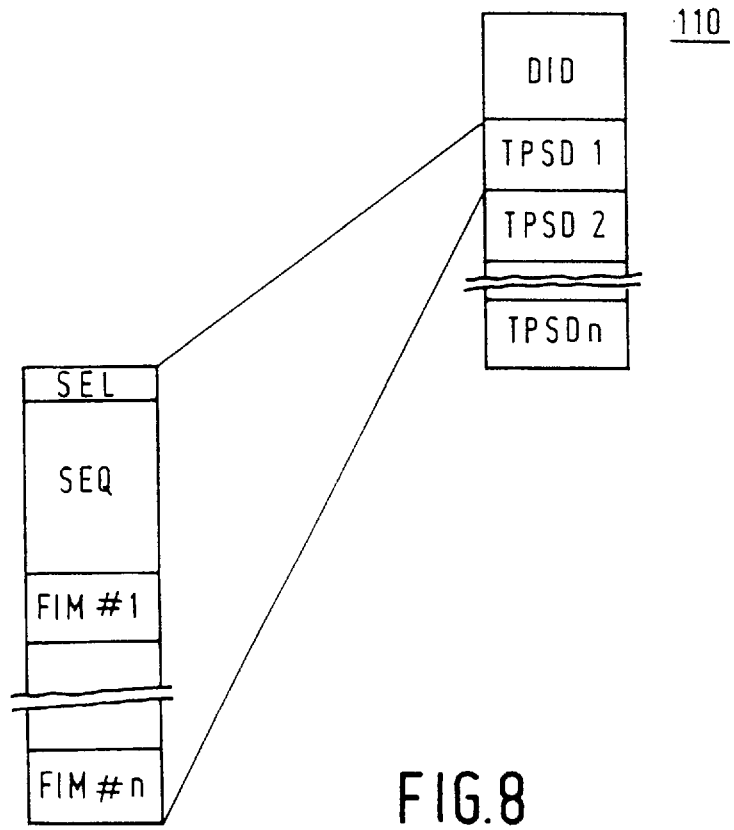
FIG. 8 shows a suitable format for recording picture parameter data on the record carrier.

FIG. 8 shows, by way of example, a suitable format 110 of the picture parameter data included in the file FPS on the record carrier. The format 110 comprises a section DID in which the unique record carrier identification code is stored. Such a code may comprise a large random number generated by means of a random-number generator and recorded on the record carrier. The code may comprise a time code indicating the time in years, months, days, hours, minutes, seconds and fractions of seconds. Alternatively, the record carrier identification code may comprise a combination of a time code and a random number. In the format 110, the section DID is followed by sections FPS1, FPS2, . . . , FPSn in which a number of different sets of picture parameter data are stored. Each of the preferential reproduction setting sections FPS1, . . . , FPSn contains a portion SEL in which a set identification number for each of the different sets of picture parameter data to be selected by different users are specified, and a portion specifying the sequence SEQ in which the representations of the stored pictures are to be reproduced. This portion is followed by the coded sections FIM#1, . . . , FIM#n storing, for the pictures 1, . . . , n, the picture parameter data indicating preferential processing operations to be performed before the representation of the relevant picture are displayed.

Figure 9:
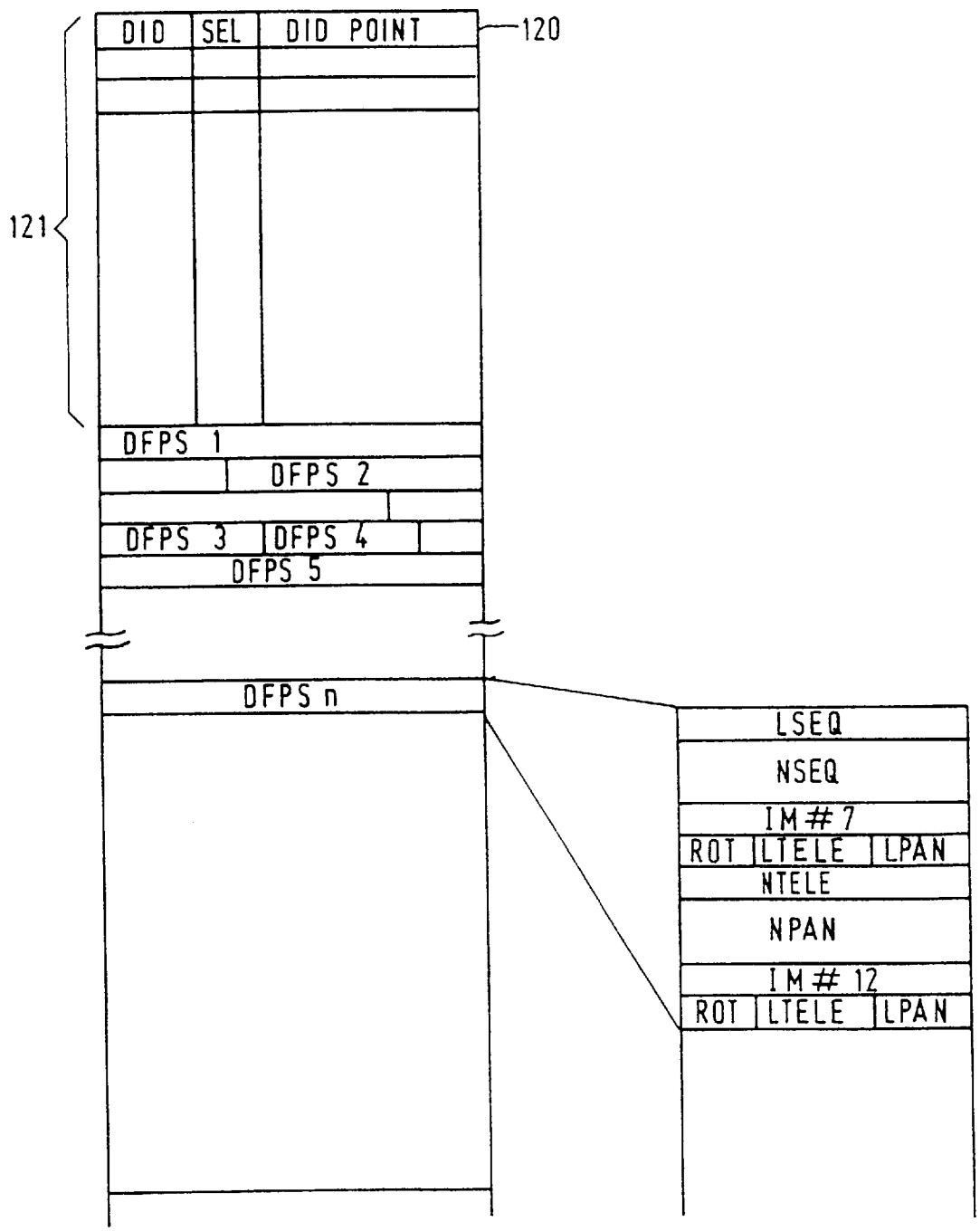
FIG. 9 shows a suitable format for storing picture parameter data in a non-volatile memory.

FIG. 9 shows, by way of example, a suitable format 120 in which the information about the desired adaptations of the set of picture parameter data can be stored in the non-volatile memory 105. The format 120 comprises a section 121 specifying combinations of record carrier identifications and set identification numbers for which information about picture parameter data has been stored. To each of these combinations, a pointer is assigned, which pointer is included in the section DID-POINT and specifies the address of the sections DFPS1, . . . , DFPSn in the non-volatile memory 105.

Every section DFPS comprises a portion LSEQ with a code indicating the space (for example in numbers of bytes) required to specify the new sequence. If the portion LSEQ indicates a length not equal to zero LSEQ will be followed by a portion NSEQ with the data specifying the new display sequence. After NSEQ, the new preferential processing operations are specified for every picture with modified preferential processing operations. ROT indicates the section with the orientation code. The sections LTELE and LPAN specify the length available for the storage of the new data relating to picture magnification (in a section NTELE) and picture translation (in a section NPAN). In this way, it is possible to select the accuracy with which the picture processing information is to be stored. Thus, it is possible, for example, to define three different lengths indicating three different accuracies. LTELE and LPAN are followed by the portions NTELE and NPAN. If the information about the picture magnification and picture translation need not be changed, this is indicated by the length zero in LTELE and LPAN. By storing only the preferential processing operations for pictures with modified preferential processing operations, the space required for the storage of the new picture parameter data is reduced considerably. Apart from the reduction of the required storage space by said recording of the differences, it is possible to obtain an additional reduction by specifying the length required for the storage of modified data. When the record carrier is read an adapted set of picture parameter data is derived from the picture parameter data recorded on the record carrier and the differences stored in the memory 105, and this adapted set is stored in the memory 102.

Instead of, or in addition to, the fixed non-volatile memory 105, a changeable memory 106, for example, in the form of a magnetic card, EPROM, EEPROM or NVRAM, can be employed for the storage of picture parameter data in the retrieval and display system shown in FIG. 7.

This has the advantage that a user can display the picture information on a record carrier in accordance with the same picture parameter data on different picture retrieval and display systems to which a changeable memory 106 can be connected. When one of the two or both memories 105 and 106 are used for the storage of picture parameter data, it is desirable that a selection is made from the different sets of picture parameter data defined by the sets of picture parameter data on the record carrier and by the modifications of the picture parameter data stored in the memories 105 and 106. For this purpose, the unit 101 should comprise selection means. These selection means may be of a type which are operated by the user to make a choice from the various sets of picture parameter data defined for one specific record carrier and selection number by the picture parameter data information stored on the record carrier and in the memories 105 and 106. However, alternatively, these selection means may be of a type which, prior to reproduction on the basis of the contents of the memories 105 and 106 and the sets of picture parameter data recorded on the record carrier, determine the sets of picture parameter data available for the relevant record carriers and store them, for example, in the memory 102. Subsequently, one of the available sets of picture parameter data in the memory 102 is selected in accordance with a predetermined selection criterion. Preferably, the selection criterion is such that the highest priority is assigned to the picture parameter data information in the changeable memory 106, medium priority to the picture parameter data information in the non-volatile memory, and the lowest priority to the picture parameter data on the record carrier. If the unit 101 comprises a computer, automatic selection can be realized by loading the computer with a suitable selection program.

Now reference is made to the file OV in FIG. 2, which, for all the picture files IP1, IPn, comprises a subfile TV/16 containing an absolutely coded low-resolution picture. Recording a file OV has the advantage that an overview of the digitized picture information recorded on the record carrier can be obtained with a minimal access time. This is possible, for example, by successively displaying the digitized pictures in the subfile TV/16 as representations which wholly or partly fill the display screen, preferably in the sequence defined by the selected set of picture parameter data. However, it is also possible to compose a representation in the form of a so-called mosaic picture from the subfiles, in which mosaic picture, a large number of representations of the coded low-resolution pictures contained in the subfiles TV/16 are arranged in the form of a matrix, preferably in an order dictated by the selected set of picture parameter data. By way of illustration, FIG. 10 shows a mosaic picture 130 made up of the representations (IM#1, IM#3, . . . , IM#26) of sixteen low resolution subfile pictures.

Figures 10, 11:
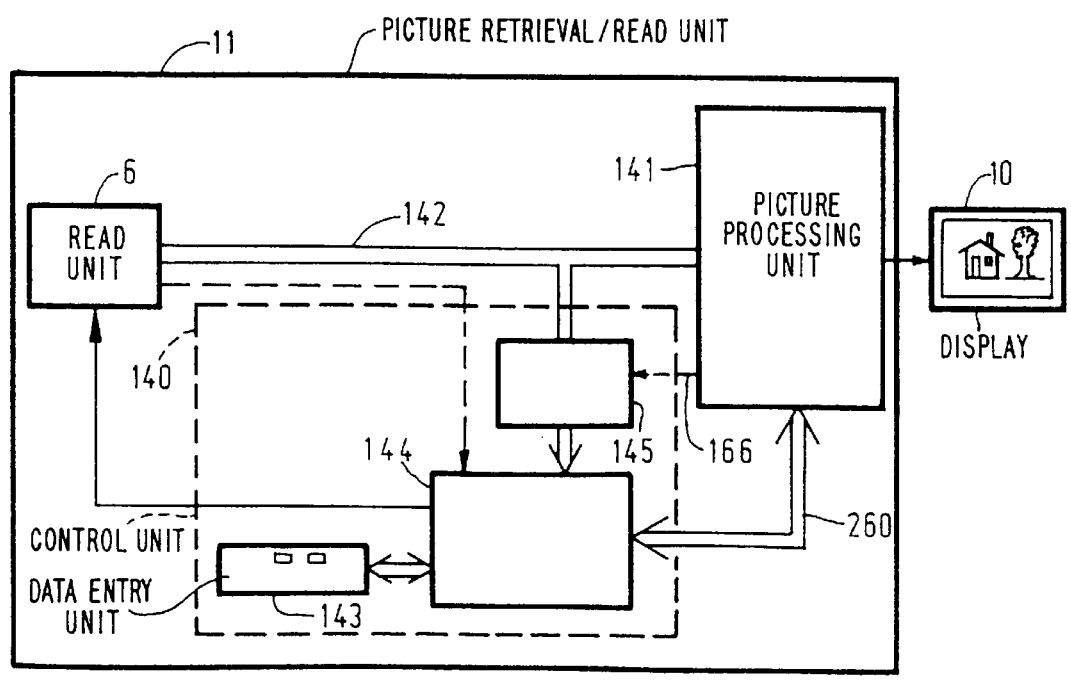
FIG. 10 shows a mosaic picture composed of sixteen low-resolution pictures.
FIG. 11 shows, in greater detail, an embodiment of the simplified picture retrieval and reproduction system.

FIG. 11 shows an embodiment of the picture retrieval and display system of FIG. 1c in more detail. In the present system, the picture retrieval and read unit 11 comprises the read unit 6, a control unit 140 and a picture processing unit 141. The read unit 6 supplies the information read from the record carrier to the control unit 140 and to the picture processing unit 141 via a signal path 142. The control unit 140 then selects specific information contained in the control files BB and IIDB from the information read. The picture processing unit 141 selects picture information from the information read and converts this picture information into a form suitable for the display unit 10. The read unit 6 and the picture processing unit 141 are controlled by the control unit 140 on the basis of the data entered by a user, for example, via a data entry unit 143, and on the basis of the control data in the control files BB and IIDB.

Figure 12:
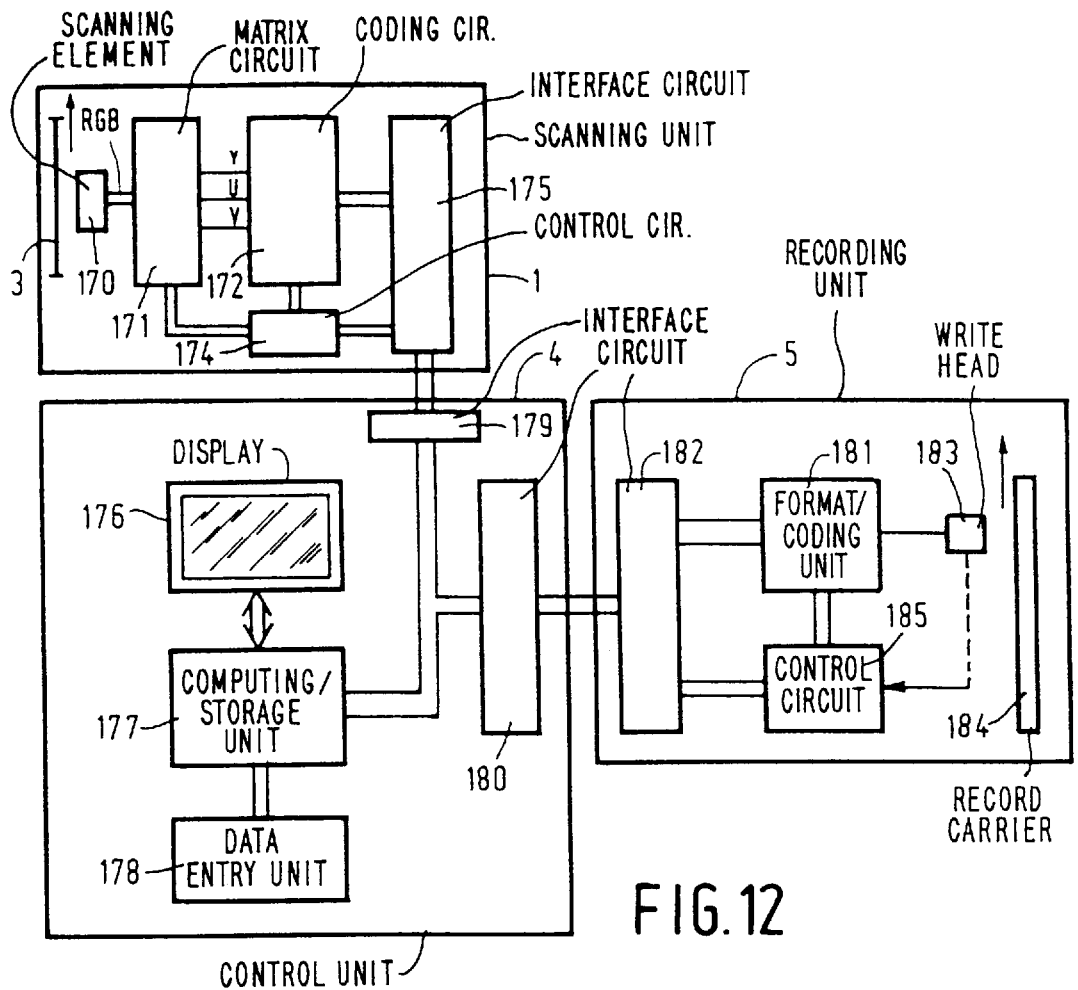
FIG. 12 shows, in greater detail, an embodiment of the picture storage system.

FIG. 12 shows an embodiment of the picture storage system 12 in greater detail. The scanning unit 1 in FIG. 12 comprises a scanning element 170 for scanning the photographic picture capture medium 3 and for converting the scanned picture information into customary information signals, for example, RGB picture signals, representing the scanned picture. The picture signals at the output of the scanning element define the highest attainable resolution in number of pixels per picture. The information signals supplied by the scanning element 170 are converted into a luminance signal Y and two color-difference signals U and V by means of a customary matrix circuit 171. A coding circuit 172 converts the signals Y, U and V, in a customary manner, into absolutely coded signals (for the lower-resolution pictures) and residually coded signals (for the higher-resolution pictures) in accordance with the coding schemes described hereinbefore. The scanning element 170, the matrix circuit 171 and the coding circuit 172 are controlled by means of a customary control circuit 174 on the basis of control commands applied to the control circuit 174 by the control unit 4 via an interface circuit 175. The absolutely and residually coded picture information generated by the coding circuit 172 is applied to the control unit 4 via the interface circuit 175. The control unit 4 may comprise a computer system comprising a display unit 176, a computing and storage unit 177 and a data entry unit 178, for example, a keyboard, for data input by the user. In a customary manner, the display unit 176 and the data entry unit 178 are coupled to the computing and storage unit 177. The computing and storage unit 177 is further coupled to the picture scanning unit 1 and the recording unit 5 via interface circuits 179 and 180, respectively. The recording unit 5 comprises a formatting and coding unit 181 which converts the information to be recorded, this information being received from the control unit 4 via an interface circuit 182, into codes which are suitable for recording and which are arranged in a format suitable for recording. The data which has thus been coded and formatted is applied to a write head 183, which records a corresponding information pattern on the record carrier 184. The recording process is controlled by a control circuit 185 on the basis of the control commands received from the control unit 4 and, if applicable, address information indicating the position of the write head 183 relative to the record carrier 184.

The storage and control unit 177 is loaded with suitable software to arrange the residually coded digitized picture information supplied by the scanning unit 1 in a customary manner in accordance with the afore-mentioned formatting rules and to compose the picture files IP and OV. Moreover, the computing and storage unit 177 has been loaded with software for inserting in the control file, in a customary manner, and in accordance with the afore-mentioned formatting rules, the picture parameter data input by an operator together with other automatically generated control data, such as, for example, a list of addresses at which the various files have been recorded on the record carrier 184.

The computing and storage unit 177 may further have picture processing software enabling the scanned picture information to be processed, for example, for the purpose of error correction, such as, for example, out-of-focus correction and grain removal, or for the purpose of color adaptation or brightness adaptation of the picture.

The files, composed by means of the computing and storage unit 177, are applied to the recording unit 5 in the desired sequence in order to be recorded.

Very suitable combinations of a record carrier 184 and a recording unit 5 have been described in detail inter alia in European Patent Application Nos. 88203019.0, corresponding to U.S. Pat. No. 5,001,035 (PHQ 88.001), 90201309.3, corresponding to U.S. patent application Ser. No. 08/427,781, filed Mar. 2, 1994 (PHQ 89.016), 8900092.8, corresponding to U.S. Pat. No. 4,901,300 (PHN 12.398), 8802233.8, corresponding to U.S. Pat. No. 4,979,168 (PHN 12.299), 8901206.3, corresponding to U.S. Pat. No. 5,060,219 (PHN 12.571), 90201094.1, corresponding to U.S. Pat. No. 5,418,764 (PHN 12.925), 90201582.5, corresponding to U.S. Pat. No. 5,303,217 (PHN 12.994), 90200687.3, corresponding to U.S. Pat. No. 5,124,966 (PHN 13.148), 90201579.1, corresponding to U.S. Pat. No. 5,226,027 (PHN 13.243), and Dutch Patent Application Nos. 8902358, corresponding to U.S. Pat. No. 5,428,598 (PHN 13.088) and 9000327, corresponding to U.S. Pat. No. 5,072,435 (PHN 13.242). The record carrier described therein is eminently suited for recording information in accordance with a CD format. A recording device for recording the files on such record carrier is shown diagrammatically in FIG. 13. The shown recording device comprises a formatting circuit 186, which composes the information to be recorded, which has been applied via the interface circuit 182, in accordance with a formatting scheme , for example, as is customary in the so-called CD-ROM or CD-ROM XA system.

Figure 13:
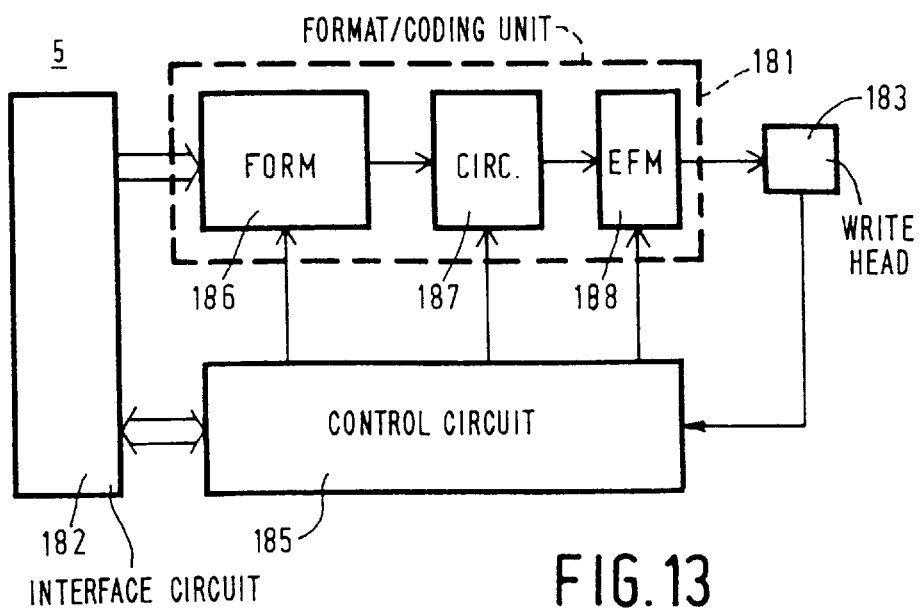
FIG. 13 shows a recording unit for use in the picture storage system.
Figure 14:
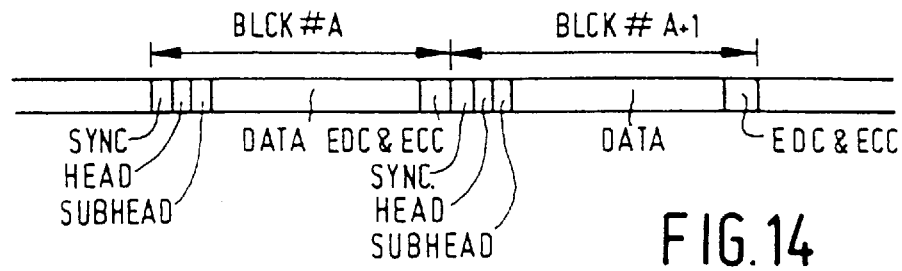
FIG. 14 diagrammatically illustrates the CD-ROM XA format.

By way of illustration, this format is shown broadly in FIG. 14. In accordance with this format, the data is arranged in blocks BLCK of a length corresponding to the length of a subcode frame in the CD signal. Each block BLCK comprises a block synchronizing section SYNC, a header section HEAD containing an address in the form of an absolute time code corresponding to the absolute time code in the subcode portion recorded with the block, and if the CD-ROM XA format is used, the block BLCK further comprises a subheader section SUBHEAD containing, inter alia, a file number and a channel number. In addition, each block BLCK comprises a DATA section containing the information to be recorded. Each block BLCK may also comprise a section EDC&ECC containing redundant information for the purpose of error detection and error corrections. The recording unit 5 shown in FIG. 13 further comprises a CIRC coding circuit 187 for interleaving the information and for adding parity codes for the purpose of error detection and error correction (hereinafter also referred to as error correction codes). The CIRC encoding circuit 187 performs the above-mentioned operations upon the formatted information supplied by the formatting circuit 186. After these operations have been performed, the information is applied to an EFM modulator 188, in which the information is given a form which lends itself better for recording on the record carrier. Moreover, the EFM modulator 188 adds subcode information, which includes, inter alia, an absolute time code as address information in the so-called subcode Q channel.

Figure 15:
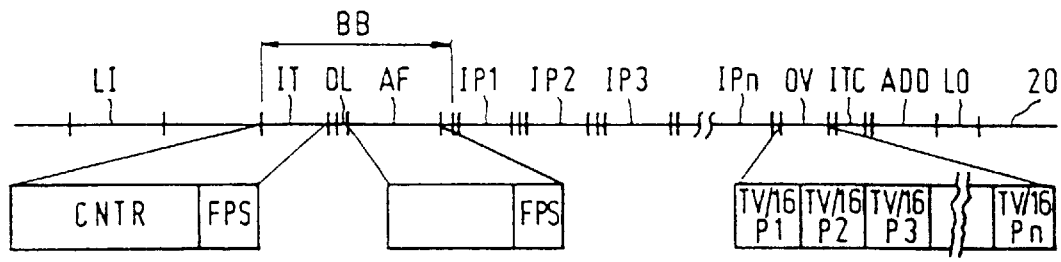
FIG. 15 shows a suitable organization of the record carrier if the picture information has been recorded in accordance with a CD-I format.

FIG. 15 shows an organization of the record carrier in the case that the information has been recorded in the track 20 in accordance with the CD format described above. Parts corresponding to the organization shown in FIG. 2 bear the same reference numerals.

The recorded information is preceded by a lead-in section LI (also referred to lead-in track), as is customary in the recording of CD signals, and is terminated with a customary lead-out section LO (also referred to as lead-out track).

When the information is recorded in CD format, it is preferred to include, in the control file BB, a section recorded in accordance with the CD-I standard. These sections are the "Disk Label & Directory", referenced DL, and the so-called application programs, referenced AF. This enables the recorded picture information to be displayed by means of a standard CD-I system. Preferably, a subfile FPS with the sets of picture parameter data is also included in the application program section AF. In addition to the sections DL and AT, the control file BB comprises a subfile IT comprising a section CNTR with control data and a section FPS with the sets of picture parameter data. Preferably, the section IT is recorded in a predetermined area, also known as the "pregap" on the record carrier in a section of predetermined length. This is in order to simplify retrieval of the required information by the microcomputer. Further recording in the pregap has the advantage that the format meets the CD-I format requirements. If the section IT is not large enough to accommodate all the control data, a part of the control data can be recorded in a section ITC after the file OV. In that case, it is preferred to include a pointer in the section IT to specify the starting address of ITC.

Figure 16:
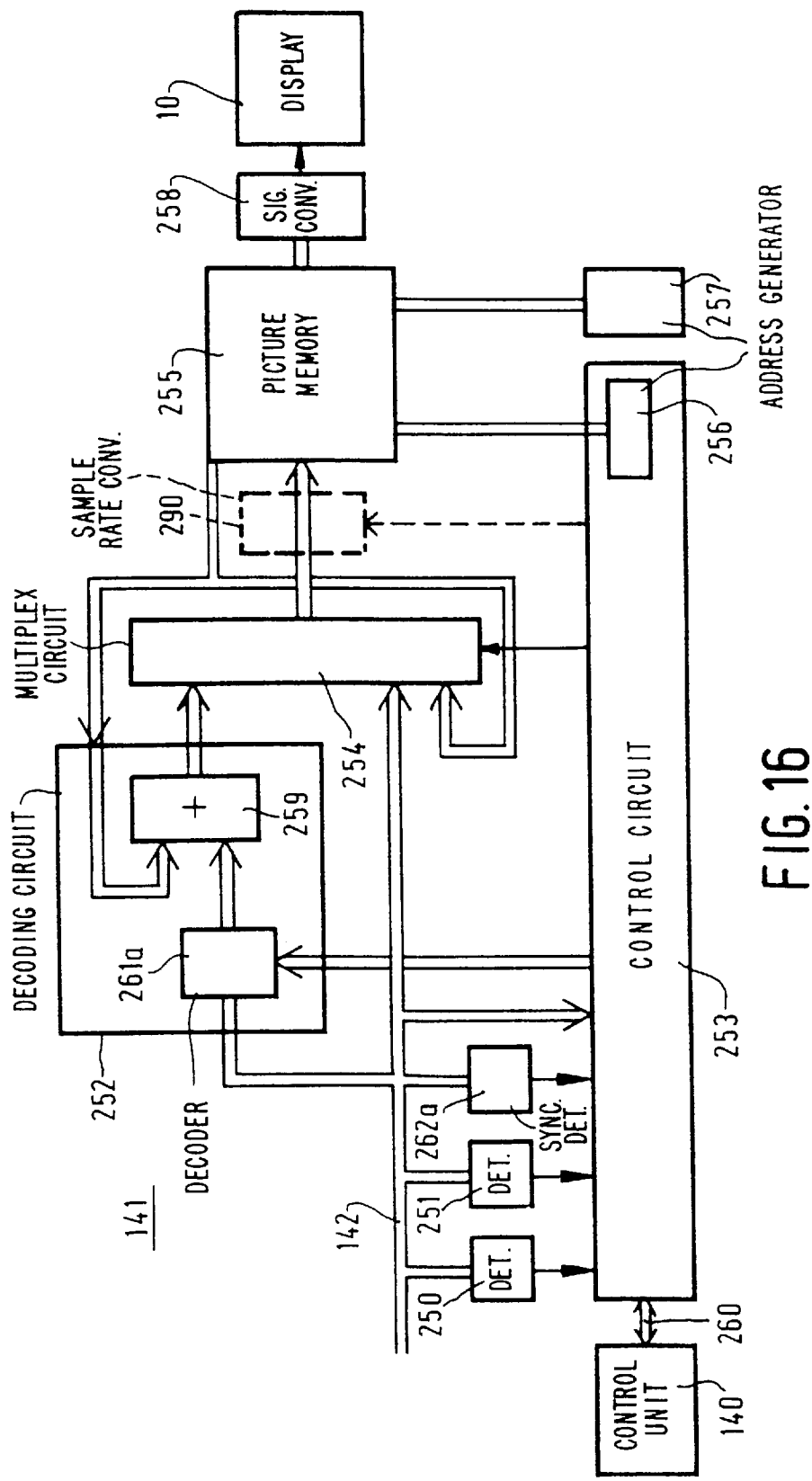
FIG. 16 shows an example of a picture processing unit.

FIG. 16 shows the picture processing unit 141 in greater detail. The picture processing unit 141 comprises a first detection circuit 250 for detecting synchronization codes LD and picture line numbers LN indicating the beginning of each residually coded picture line. A second detection circuit 251 serves for detecting the beginning of each subfile in each picture file with a residually coded picture to indicate the beginning of the section IIDB containing the addresses of a number of digitizing picture lines. It is to be noted that the detection circuits 250 and 251 are needed only for processing the residually coded pictures and not for processing absolutely coded pictures. For the purpose of these detections, inputs of the first and the second detection circuit 250 and 251 are connected to the signal path 142. A decoding circuit 252, for decoding the residually coded picture information, and a control circuit 253, for controlling the picture processing operation, are connected to the signal path 142. The signal path 142 and outputs of the decoding circuit 252 are connected to data inputs of a picture memory 255 via a multiplex circuit 254, to store the read and decoded picture information. Data outputs of the picture memory 255 are connected to the inputs of the decoding circuit 252 and to the inputs of the multiplex circuit 254. The control circuit 253 comprises an address generator 256 for addressing the memory locations in the picture memory 255. The picture processing unit 141 further comprises a second address generator 257 for addressing the memory locations in order to output the content of the picture memory to a signal converter 258. The signal converter 258 is of a customary type which converts the picture information read from the picture memory 255 into a form suitable for application to the picture display unit 10. The decoding circuit 252 may comprise, for example, a Huffman decoding circuit 261a, controlled by the control unit 253, and an adder circuit 259. The Huffman decoding circuit 261a decodes the information received via the signal path 142 and subsequently supplies this decoded information to one of the inputs of the adder circuit 259. Another input of the adder circuit 259 is connected to the data outputs of the picture memory 255. The result of the adding operation performed by the adder circuit 259 is applied to the multiplex circuit 254. The control circuit 253 is coupled to the control unit 140 via a control signal path 260. The control circuit 253 may comprise, for example, a programmable control and computing unit. Such a control and computing unit may comprise, for example, a dedicated hardware unit or a microprocessor system loaded with suitable control software, by means of which, on the basis of control commands received via the control signal path 260, the address generator 256 and the multiplex circuit 254 are controlled in such a way that a selected portion of the picture information applied via the signal path 142 is loaded into the picture memory. The information thus stored in the picture memory 255 is read with the aid of an address generator 257 and is subsequently applied to the display unit 10 via the signal converter 258 in order to be displayed.

Figure 17:
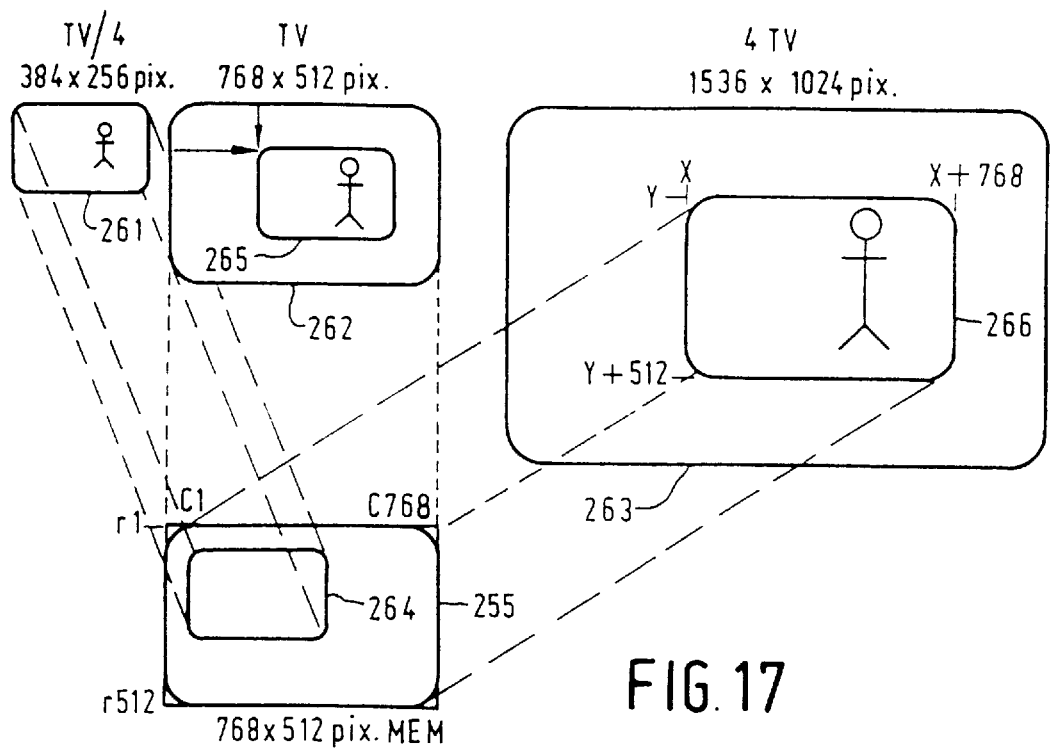
FIGS. 17 and 18 illustrate picture processing functions to be performed by the picture processing unit.

In FIG. 17, the reference numerals 261, 262, 263 denote picture representations of the same picture but with different resolutions. The representation 261 comprises 256 picture lines of 384 pixels each. The representation 262 comprises 512 picture lines of 768 pixels each and the representation 263 comprises 1024 picture lines of 1536 pixels each. The digitized pictures corresponding to the representations 261, 262 and 263 are included in consecutive subfiles TV/4, TV and 4TV of a picture file IP. The capacity of the picture memory 255, shown in FIG. 17, is 512 rows of at least 768 memory locations (also called memory elements). If a representation should represent the entire coded picture, that subfile is selected from the picture file IP, whose number of pixels corresponds to the capacity of the picture memory, which, in the present case, is the subfile defining the representation 262. This selection can be made on the basis of the setting data, such as picture numbers and resolution order (this is the identification of the subfile resolution), which are stored at the beginning of each subfile in, for example, the header HEAD and the subheader SUBHEAD of the blocks BLCK. For each subfile, this data is read in by the control circuit 253 in response to a signal supplied by a block synchronization detector 262a upon detection of the beginning of each block BLCK.

In the case that a representation of an absolutely coded picture is to be reproduced, upon detection of the beginning of the subfile to be selected, the control circuit sets the multiplex circuit 254 to a state in which the signal path 142 is connected to the data inputs of the picture memory 255. Moreover, the address generator 256 is set to a state in which the memory locations are addressed in synchronism with the reception of the successive pixel information, in such a way that the information for the picture lines 11, . . . , 1512 is stored in the respective rows r1, . . . , r512 of the memory 255. The picture information thus loaded into the memory 255 is read out and is converted into a form suitable for the display unit 10 by means of the signal converter 258. The read-out sequence is determined by the sequence in which the address generator 257 generates the successive addresses. During normal reproduction, this sequence is such that the memory is read in a row-by-row fashion, starting with the row r1 and starting with column c1 within a row. This is possible both in accordance with the interlaced-scan principle and the progressive-scan principle. In the case of read-out according to the interlaced-scan principle, all the odd rows of the picture memory 255 are read first and subsequently all the even rows of the picture memory 255 are read. In the case of read-out in accordance with the progressive-scan principle, all the rows are read in sequence.

A very attractive alternative for the method of storing the picture information in the picture memory 255 is that in which the picture memory 255 is first filled with picture information from a picture file defining a lower-resolution representation of a picture, and subsequently, the content of the memory is overwritten with a coded picture defining a higher-resolution representation of the same picture. In the above example, this is possible in that during read-out of each coded pixel from the subfile TV/4 each of a group of 2×2 memory elements is each time filled with the signal value defined by this coded pixel. This method is known as the "spatial replica" method. A better picture quality is obtained by filling only one of the memory elements of the 2×2 matrix with the signal value defined by a read-out pixel, and by deriving the other pixels of the 2×2 matrix from adjacent pixels by means of known interpolation techniques. This method is known as the "spatial interpolation" method. After detection of the next subfile (in the present case, TV), the content of the picture memory is each time overwritten with the picture information of this subfile in the methods described above. The amount of information in the subfile TV/4 is only a quarter of that in the subfile TV. This results in a substantial reduction of the time after which a first provisional picture is displayed on the display unit. After read-out of the picture file TV/4, this low-resolution picture is overwritten with a representation of the same picture having the desired resolution. As the picture files with coded pictures of successive resolutions succeed one another directly, no time is lost in searching for the subfile TV after read-out of the subfile TV/4.

Figure 18:
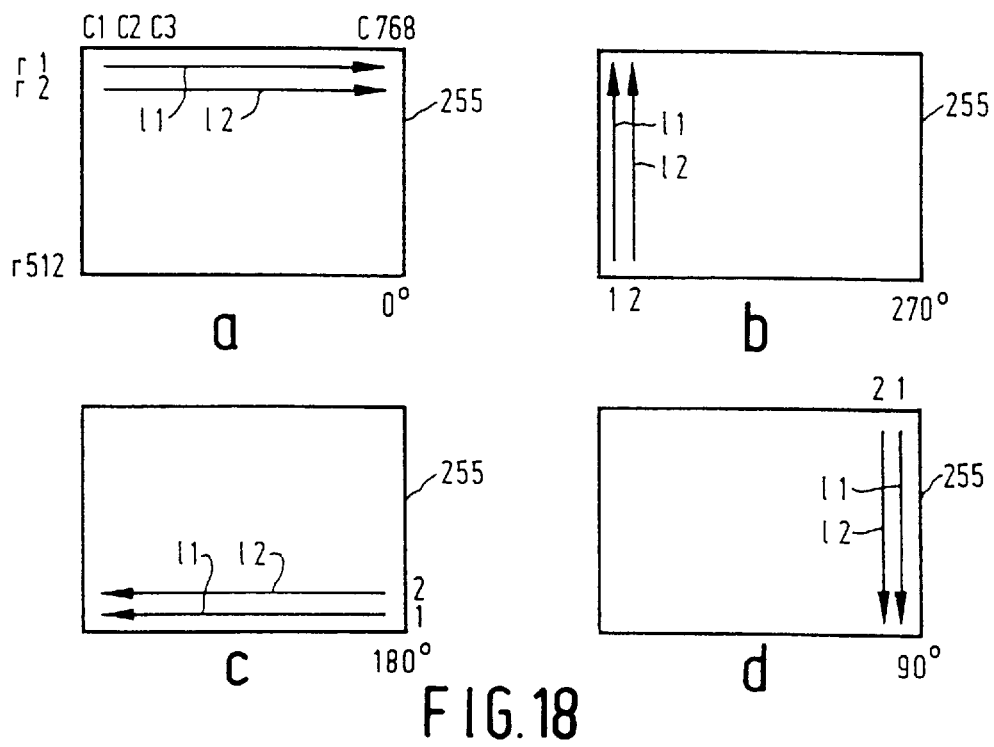

In the case that a picture is to be rotated, the address generator 256 is set to a state in which the sequence of addressing the memory locations is adapted in accordance with the desired rotation angle. FIGS. 18*b*, 18*c* and 18*d* illustrate how the picture information is stored in the memory for a rotation through an angle of 270, 180 and 90 degrees, respectively. For the sake of clarity, these Figures only show the positions of the information of the first two picture lines 11 and 12 of the picture.

In the case that a representation of a small picture is to be displayed within the outline of a full-scan representation of another picture or, if desired, the same picture (PIP function), this can be achieved simply by filling the desired location of the picture memory 255 with the low-resolution picture of the subfile TV/4 without magnification. When the picture memory 255 is filled, the address generator 256 is then set to a state in which the information for memory locations is addressed in which the small picture is to be stored. To illustrate this, these memory locations are represented as a frame 264 in FIG. 17. During the picture processing described above, the presence of the low-resolution picture in the subfile TV/4 again has the advantage that the picture information required to perform this function is directly available in the picture file IP, so that additional processing is not necessary.

When an enlarged representation of a part of the absolutely digitized picture is to be displayed, the information of a part of the picture, for example, the part corresponding to a frame 265, is selected. The information of each pixel of the selected part is loaded into every memory location of a group of 2×2 memory locations, so that a magnified full-scan representation of low resolution is displayed on the display unit. Instead of repeating each pixel 2×2 times in the memory, the memory may be filled in accordance with the spatial-interpolation principle mentioned in the foregoing.

In order to magnify the residually coded pictures, the above step is performed first. Subsequently, the part represented by the frame 266 is selected in the subfile 4TV. The part in the frame 266 corresponds to the part within the frame 265 in the representation 262. The control circuit 253 sets the multiplex circuit 254 to a state in which the output of the residual decoding circuit 252 is connected to the data inputs of the memory 255. The address generator 256 is set to a state in which it addresses the picture memory 255 in synchronism with the received coded pixels in the sequence in which the residually coded digitized picture information from the subfile 4TV becomes available. The picture information in the addressed memory locations is applied to the decoding circuit 252 and, by means of the adder circuit 259, it is added to the residual value, after which the information thus adapted is loaded into the addressed memory location. The part of the picture information recorded on the record carrier corresponding to the frame 266 is preferably read on the basis of the information in the control file IIDB. The information in the section IIDB is read in by the control circuit 253 in response to a signal from the detector 250.

Subsequently, the address of that digitized picture line is selected from this information which is situated shortly before the first digitized picture line corresponding to the picture line in the frame 266. After this, the control circuit supplies a command to the control unit 140 via the control signal path 260, the control unit, in response to this command, initiating a search process in which the part with the selected digitized picture line is located. When this part is found, the read-out of the picture information is started and the adaptation of the content of the memory 255 is started as soon as the part of the first digitized picture line, which corresponds to the part of the picture within the frame 266, is reached. The detection of this digitized picture line is effected on the basis of the line numbers which, together with the line synchronization codes LD, have been inserted at the beginning of each digitized picture line. The control circuit reads in these line numbers LN in response to a signal from the detector circuit 251. The storage of the address information at the beginning of the subfile 4TV enables a rapid access to the desired information to be obtained. The detection of the read-out of the desired residually digitized picture lines is simplified by the presence of the line synchronization codes and line numbers in the subfile 4TV.

Figure 19:
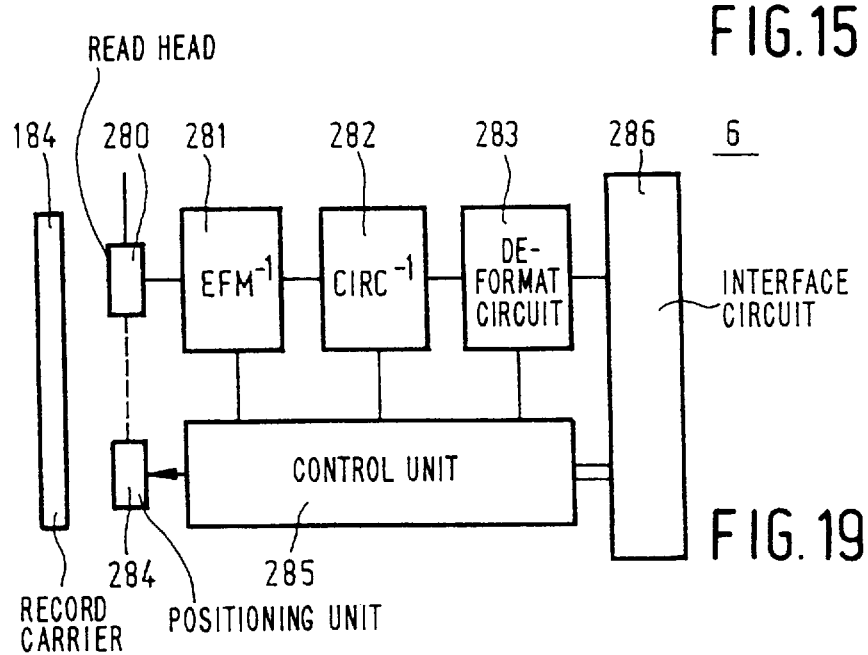
FIG. 19 shows an embodiment of a read device.
Figure 20:
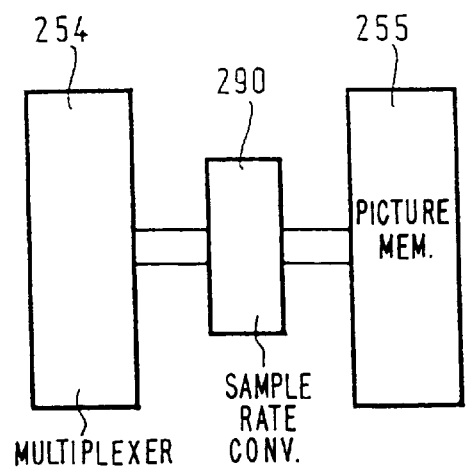
FIG. 20 diagrammatically illustrates the use of a sample rate converter in a simplified picture processing unit.

FIG. 19 shows an embodiment of the read unit 6 by means of which it is possible to read out the coded picture information recorded on the record carrier by means of the recording unit shown in FIG. 13. The shown read unit 6 comprises a customary read head 280 which reads the information patterns on the record carrier 184 by scanning the track 20 and converts the resulting information into corresponding signals. The read unit further comprises a customary positioning unit 284 for moving the read head 280 in a direction transverse to the tracks to a portion of the track 20 specified by a selected address. The movement of the read head 280 is controlled by a control unit 285. The signals converted by the read head 280 are decoded by an EFM decoding circuit 281 and are subsequently applied to a CIRC decoding circuit 282. The CIRC decoding circuit 282 is of a customary type, which restores the original structure of the information which has been interleaved prior to recording, and which detects and, if possible, corrects incorrectly read codes. Upon detection of incorrigible errors, the CIRC decoding unit supplies a new error flag signal. The information which has been restored and corrected by the CIRC decoding circuit 282 is applied to a deformatting circuit 283 which removes the additional information added by the formatting circuit 186 prior to recording. The EFM demodulating circuit 281, the CIRC decoding circuit 282, and the deformatting circuit 283 are controlled, in a customary manner, by the control unit 285. The information supplied by the deformatting circuit 283 is applied via an interface circuit 286. The deformatting circuit may comprise an error correction circuit by means of which errors which cannot be corrected by the CIRC decoding circuit can be detected and corrected. This is effected by means of redundant information EDC & ECC added by the formatting circuit 166. The error correction circuit, which is comparatively complex and therefore comparatively expensive, is not necessary. This is because the effects of erroneously read codes in the absolutely coded picture information can be masked simply by replacing the incorrectly read coded pixels and/or a complete coded picture line by picture information derived from one or more adjacent coded pixels or adjacent coded picture lines. Such a correction can be effected simply by means of the signal processing unit 141 shown in FIG. 16, by programming the control circuit 253 so as to be responsive to the error flag signal, supplied by the CIRC decoding circuit 282, to control the address generator 256 in such a way that the information of an adjacent pixel is read and, at the same time, the multiplex circuit 254 is set to a state in which the data outputs of the picture memory 255 are connected to the data inputs. Subsequently, the address generator is reset to its previous state and, instead of the incorrectly read coded pixel, the information read from the picture memory 255 is stored at the addressed memory location.

In the case that a residually coded picture is read, the value in the memory 255 is not adapted upon detection of an incorrectly read residual value but remains unchanged. This can be achieved, for example, by causing the control circuit to generate a signal which inhibits writing into the memory 255 when the erroneous residual value is applied.

The capacity of the picture memory 255 is large, so that the cost price of such a memory is comparatively high. The memory capacity may be reduced by arranging between the multiplexer 254 and the picture memory 255, a sample rate converter 290 of a customary type, which reduces the number of pixels per line from 786 to 512.

Figure 21:
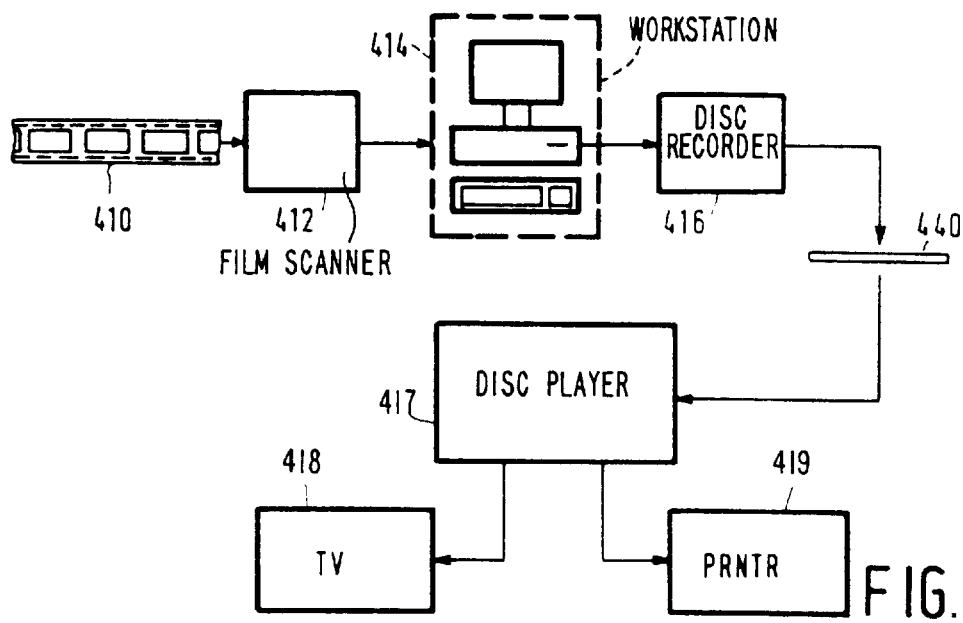
FIG. 21 diagrammatically illustrates a photographic color film processing system in which the present invention may be employed.

FIG. 21 diagrammatically illustrates a photographic color film processing system in which the present invention may be employed. However, it is to be noted that the application of the invention is not limited to this system, but may be incorporated in any digitized picture processing system.

In accordance with the digital picture processing system of FIG. 21, photographic pictures, such as a set of twenty-four or thirty-six 36 mm×24 mm picture frames of a 35 mm film strip 410, are scanned by a high resolution opto-electronic film scanner 412, such as a commercially available Eikonix Model 1435 scanner. Scanner 412 outputs digitally encoded data (e.g., a 3072×2048 pixel matrix) representative of the internal electronic scanning of a high resolution picture sensing array onto which a respective photographic picture frame of film strip 410 is projected. This digitally encoded data, or "digitized" picture, is coupled in the form of an imaging pixel array-representative bit map to an attendant picture processing workstation 414, which contains a frame store and picture processing application software through which the digitized picture may be processed (e.g., enlarged, rotated, cropped, subjected to scene balance correction, etc.) to achieve a desired picture appearance. Once a picture file has been prepared, it is stored on a transportable medium, such as a write-once optical compact disc, using an optical compact disc recorder 416, for subsequent playback by a disc player 417, which allows the picture to be displayed, for example, on a relatively moderate resolution consumer television set 418 (e.g., having an NTSC display containing and array of 485 lines by 640 pixels per line), or printed as a finished color print, using a high resolution thermal color printer 419.

As described hereinbefore in this application, each high resolution captured picture is stored as a respective picture file containing sub-files with a low, or base, resolution absolute coded picture bit TV, an absolute coded picture 4TV and a plurality of higher resolution residual coded pictures 16TV, 64TV and 256TV associated with respectively increasing degrees of picture resolution. By iteratively combining the higher resolution residual picture file data with the base resolution bit map picture, successively increased resolution pictures may be recovered from the base resolution absolute coded picture for application to a reproduction device, such as a color monitor display or hard copy printer.

The digitized pictures TV, 4TV, 16TV, 64TV and 256TV may be obtained by scanning a 36 mm×24 mm picture frame of 35 mm film strip 410. The base resolution absolute coded picture may be further subsampled in a workstation of the photo-finishing mini-lab system to derive an even lower resolution absolute code picture TV/4 (e.g., on the order of 128×192 pixels) for display on a segment of the system operator's workstation for the purpose of identifying picture orientation and specifying aspect ratio.

As pointed out above, the present invention takes advantage of the information storage capability of the compact disc to incorporate, within a header file associated with each digitized picture, additional presentation control files for each stored picture for the purpose of specifying how the picture was captured on film and has been correspondingly digitized and stored on disc, so that, when played back, the picture will have an upright orientation and the correct aspect ratio for the display device.

Figure 22:
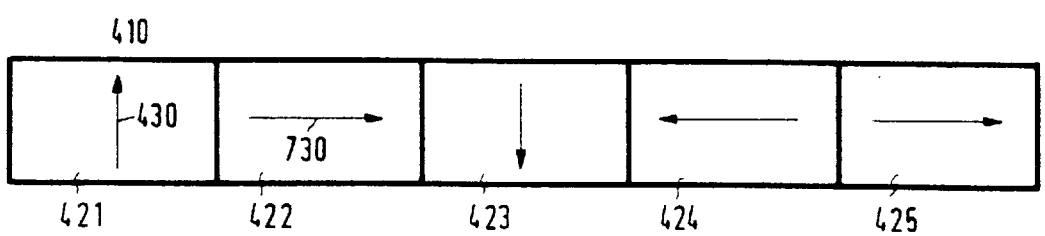
FIG. 22 diagrammatically illustrates a portion of a film strip that contains a plurality of successive picture frames on each of which a picture of an arrow has been recorded.

FIG. 22 diagrammatically illustrates a portion of the film strip 410 that contains a plurality of successive picture frames 421 . . . 425, on each of which a picture of an arrow 430 has been recorded. In frame 421, the arrow 430 has been recorded with the camera held by the photographer in its normal horizontal position. In frame 422, the arrow 730 has been recorded with the camera held by the photographer in its normal vertical position, rotated counter-clockwise 90° relative to its normal horizontal position. In frame 423, the arrow has been recorded with the camera held by the photographer in its flipped or inverted horizontal vertical position, rotated 180° relative to its normal horizontal position. In frame 424, the arrow has been recorded with the camera held by the photographer in its flipped vertical position, rotated clockwise 90° relative to its normal horizontal position. In frame 425, the arrow has been recorded with the camera held by the photographer in its normal vertical position.

While not every strip of film will necessarily contain pictures at each of the orientations shown in FIG. 22, a typical film strip can be expected to include both horizontally-shot (whether upright or inverted) and vertically-shot (either right or left hand rotation) pictures. In accordance with the present invention, rather than physically rotate either the film strip or the digitizing scanner, each picture on the film strip is scanned and digitized as though it were horizontally oriented, irrespective of its actual orientation on the film. The digitized picture is then stored in the workstation's frame store, as is, and a lower resolution version of the digitized picture is then displayed on the display monitor of workstation 414, so that the picture may be viewed by the operator. Then, as each picture is digitized and stored, the system operator, using a workstation input device (e.g., a keyboard or mouse) enters a set of 'presentation' control codes that are incorporated within a presentation control file associated with each respective picture file.

Figure 23:
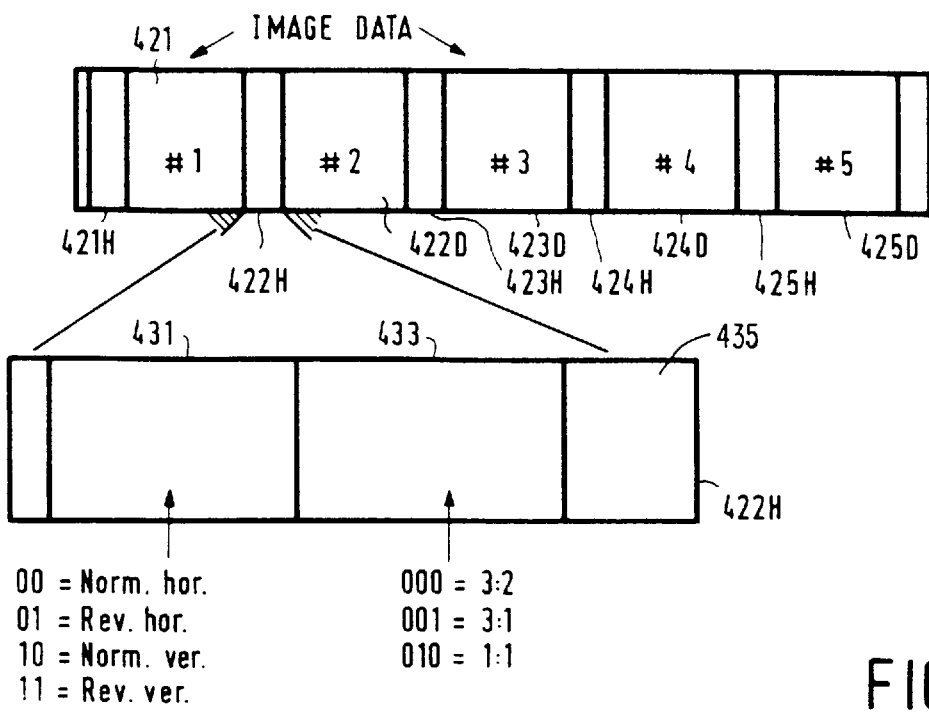
FIG. 23 shows the format of a header file.

The format of a presentation control file, such as header file 422H associated with picture data file 422D, into which normal vertical picture frame 422 on film strip 410 has been digitized by scanner 412, is shown in FIG. 23 as comprising an M-bit orientation filed 431, an N-bit aspect ratio field 433 and a supplemental field 435, in which additional information, such as title, date, etc., may be inserted by the operator in the course of formatting a digitized picture for storage on the disc. For the four possible picture orientations described above and depicted in FIG. 22, M=2 bits are required for the orientation field 431. The code width of aspect ratio field 433 depends upon the number of allowable picture aspect ratios; providing a three bit code width will accommodate up to eight different aspect ratios. It should be observed that the parameters and field formats given here are merely for purposes of illustration and are not to be considered limitative of the invention. As in any data processing application, what is required is that the actual coding structure and data format of the header field be capable of being read and interpreted by the underlying control mechanism in the reproduction device. Rather than describe the coding details of that mechanism, the description to follow will set forth the architecture of the storage and retrieval mechanism and the manner in which it processes pictures having a variety of orientations and aspect ratios.

Figure 24:
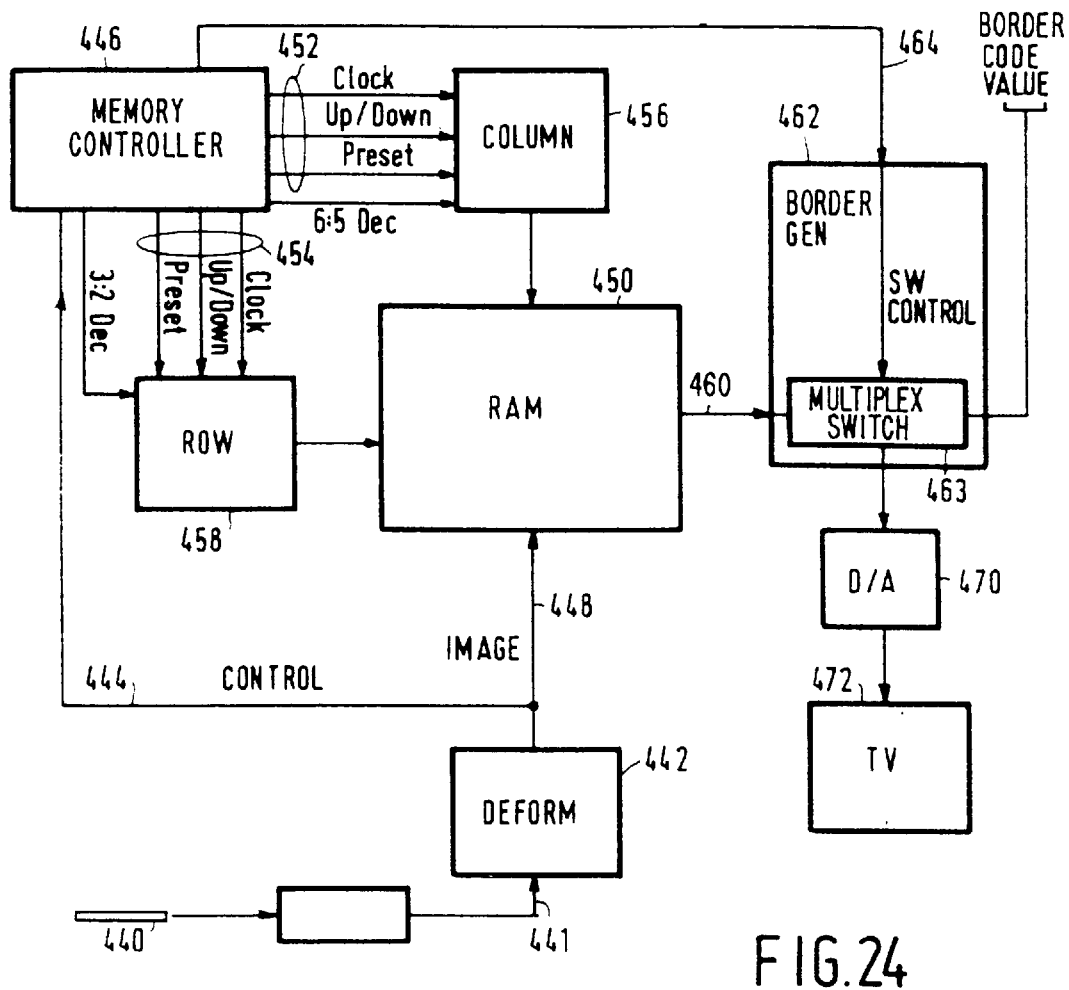
FIG. 24 diagrammatically illustrates the signal processing architecture of a picture retrieval mechanism in accordance with the present invention.

FIG. 24 diagrammatically illustrates the signal processing architecture of a picture retrieval mechanism in accordance with the present invention, which may be incorporated in a commercially available digital data storage and retrieval device, such as a compact disc player, for supplying video signals to an associated display device, such as a color television monitor. As shown in the figure, data read from a disc 440 is coupled over input bus 441 to a deformatter 442, which separates the control data (the header field) from the (512×768) data. The header data is coupled over link 444 to a memory controller 446, while the picture data is coupled over link 448 to a random access memory 450, whose storage capacity corresponds to the size of the base resolution picture (512×768 pixels) stored on the disc.

Memory controller 446 may be incorporated as part of the CD player's microcontroller or may be a separate dedicated combinational logic circuit driven by the microcontroller for controlling the generation of read out address/clock signals which are supplied over respective address bus links 452 and 454 to a set of associated column and row address counters 456 and 458, respectively, for controlling the rate and order in which contents of memory 450 are accessed.

In particular, the "clock" signal lines allow counters 456 and 458 to be incremented (when the up/down signal is asserted) or decremented (when the up/down signal is not asserted), the "preset value" lines allow the counters to be preset to the value indicated by these lines, and the "3:2 decimate" line instructs the counter 458 to skip over every third value (i.e., to provide addresses 0, 1, 3, 4, 6, 7, 9, 10, etc.), and the "6:5 decimate" line instructs the counter 456 to skip every sixth value (i.e., to provide addresses 0, 1, 2, 3, 4, 6, 7, 8, 9, 10, 12, 13, etc.).

As pointed out previously, each field of picture data for a respective digitized picture is formatted as though the picture is a normal horizontal picture and when downloaded from the disc into memory 450, the picture data is simply written directly into memory 450 in this format. The manner in which the picture is read out from memory 450 in accordance with the contents of its associated header determines the orientation and display of the picture on an associated display device (TV monitor). When picture data is read out from memory 450, it is coupled over link 460 to a border generator 462 which controllably substitutes for the pixel code values accessed from memory 450 an alternate code value, representative of a prescribed border color (e.g., black). For this purpose, border generator 462 preferably comprises a multiplexer switch 463 which connects the digital-to-analog converter 470 to either receive the pixel code data values from memory 450, or to instead receive a "border" code value representing a prescribed border color. The position of multiplexer switch 463 is controlled by the control signal on link 464 from memory controller 446. In this way, border generator 462 selectively injects 'border' pixel values, as instructed by memory controller 446, which fills in border regions of the 512×768 picture array, for the picture files where the aspect ratio code within the header field specifies that the size and shape of the picture being read out from memory should occupy less than the entirety of the display. The resulting combined picture and border data is then output to digital-to-analog converter 470 for application to a display device, such as a color TV monitor 472, so that a reproduction of the original 35 mm picture will be presented to the viewer.

Because conventional television monitors customarily employ a display screen having a 4:3 aspect ratio (and having 484 lines for an NTSC system), then, irrespective of the orientation of the 3:2 aspect ratio picture stored in memory 450, the accessing of memory 450 will require some degree of cropping or decimation of the contents of the 512×768 array. The manner in which memory controller 446 controls the generation of address signals and clocks out the contents of memory 450 for a number of respectively different picture types for the example of an NTSC system television monitor is illustrated in FIGS. 25–29.

Figure 25:
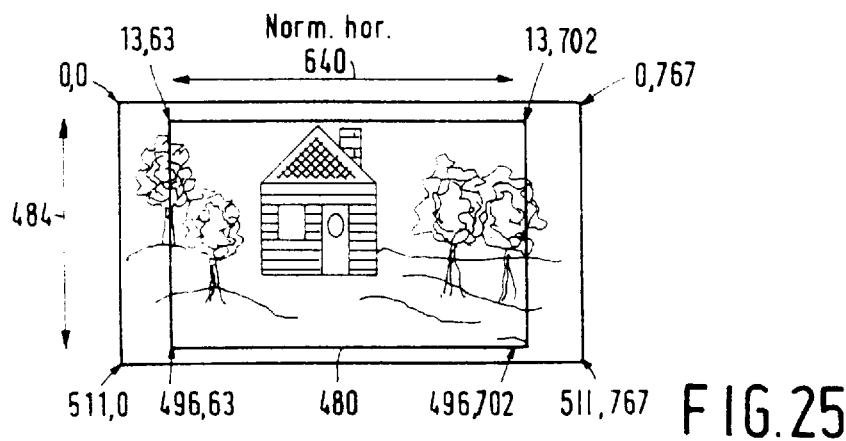
FIG. 25 illustrates the overlay of a rectangular perimeter frame sized to an NTSC TV monitor on a pixel array represented by the contents of the picture memory of FIG. 24 for a horizontal normal picture.

More particularly, FIG. 25 illustrates the overlay of a rectangular perimeter frame 480, the size and shape of which effectively correspond to a 484 row by 640 column pixel array that substantially matches the 484×640 "square pixel" display capacity of an NTSC TV monitor, "centered" on a 512×768 pixel array represented by the contents of memory 450 for a horizontal normal picture, where the contents of the picture correspond to an 'upright' picture. Since, for either an upright (normal) or inverted horizontal picture, the size of the stored picture exceeds the size of the NTSC display matrix, memory controller 446 confines its column and row output addresses to a set of boundaries that encompasses a 484×640 sub-matrix of addresses centered in frame 480 within memory array 450.

In particular, frame 480 encompasses those pixels of the 512×768 pixel array bounded by addresses Y=13, X=63; Y=13, X=702; Y=496, X=63; and y=496, X=702, where "Y" is the row address and "X" is the columns address. Those data entries of memory 450 that fall outside of frame 480 are not accessed for display, and the associated 484×640 NTSC display will display a normal horizontal picture of the pixels bounded by frame 480. For an inverted horizontal picture, the same 484×640 frame of addresses is accessed, except that the order of read-out of the successive 484 lines is reversed from that of a normal horizontal picture. For the inverted horizontal picture, the pixel code value stored at address Y=496, X=63 is the first (upper left) pixel of the video frame read from memory 450, whereas pixel Y=13, X=63 is the first pixel read out from memory for a normal horizontal picture.

Figure 26:
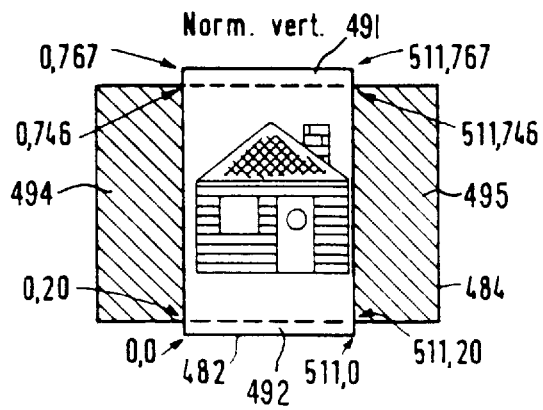
FIG. 26 illustrates a rotated rectangular perimeter frame overlay associated with a decimated sub-array portion of data entries of the picture memory of FIG. 24 on an NTSC pixel matrix, where the contents of the picture correspond to a 90° rotated picture that has been slightly de-magnified.

FIG. 26 illustrates the manner in which a vertical picture may be rotated and slightly de-magnified by decimation.

Figure 27:
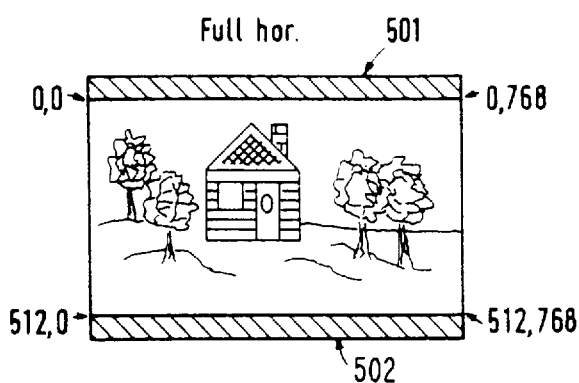
FIG. 27 illustrates the manner in which entire horizontal dimension of a stored 512×768 picture may be displayed on a 484×640 pixel matrix by performing a five-sixths decimation of column and row addresses of a normal or inverted horizontal picture.

FIG. 27 illustrates the manner in which the entire horizontal dimension of the stored 512×768 picture may be displayed using a 484×640 pixel matrix display by performing a "six-to-five" decimation of column and row addresses of a normal or inverted horizontal picture. Namely, memory controller 446 instructs column counter 456 and row counter 458 to provide column and row output addresses such that every sixth pixel and every sixth line is excluded, thereby performing a ⅚ demagnification of the full horizontal picture to a 427×640 pixel sub-array. Again, in the case of an inverted horizontal picture, the same 427×640 frame of addresses is accessed, except that the order of read-out of the successive 427 lines is reversed from that of a normal horizontal picture. Also, because of the decimation of the picture, the top and bottom of the picture are delimited by border regions 501 and 502 for which no data is accessed from memory 450. Therefore, upon read-out of the picture data from memory 450, border generator 462 supplements the 427×640 sub-array of pixel values read out from memory 450 with border color representative (e.g., black) pixel values to fill in regions 501 and 502 of the displayed picture.

Figure 28:
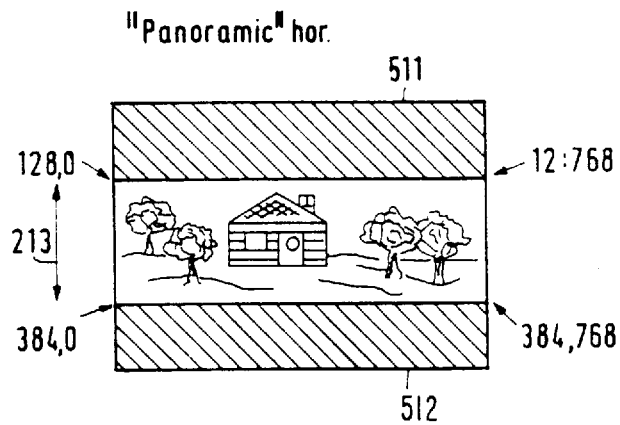
FIG. 28 illustrates the manner in which address decimation may be employed to display the entire horizontal dimension of a panoramic picture having a 3:1 aspect ratio.

FIG. 28 illustrates the manner in which address decimation, similar to that employed for the picture of FIG. 27, may be employed to automatically display the entire horizontal dimension of a panoramic picture, such as one having a 3:1 aspect ratio, as indicated by the aspect ratio code 433=001 in FIG. 23. Here, read-out of the stored picture involves the same "six-to-five" decimation of the column and row addresses of memory 450, described above with reference to FIG. 27. Because of the 3:1 panoramic aspect ratio of the picture, however, only the middle 256 rows of picture data stored in memory 450 contain useful picture data. When reading out the panoramic picture from memory, using "six-to-five" decimation, border generator 462 supplements the 213×640 sub-array of pixel values read out from memory 450 with border color representative (e.g., black) pixel values to fill in regions 511 and 512 of the displayed picture. The aspect ratio code 433 shown in FIG. 23 can also be utilized when making a thermal print via printer 424 in FIG. 21. In the case of a panoramic 3:1 aspect ratio picture, the printer can recognize that only the middle half of the rows of the 3:2 aspect ratio stored data file contain useful picture data. The top and bottom rows of the stored data file will not be printed by thermal printer 424, thus conserving expensive print media, or allowing two 3:1 aspect ratio pictures to be printed next to one another in the same space normally used to print a single 3:2 aspect ratio picture.

Figure 29:
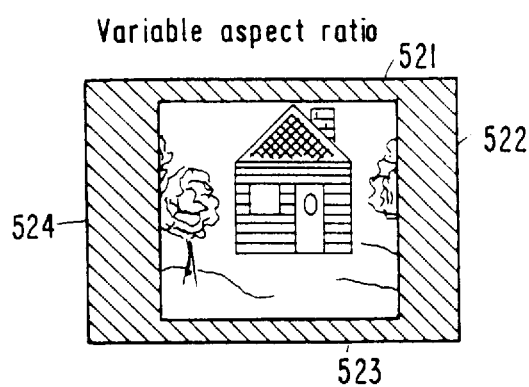
FIG. 29 shows a displayed picture having a user-generated auxiliary border.

In addition to responding to control data from deformatter 442 based upon header orientation and aspect ratio codes, memory controller 446 may be coupled to respond to usergenerated control signals for defining the limits of an auxiliary border to be injected onto the picture output by border generator 462 via line 464, so that further cropping of selected portions of a picture may be directed by the user, as shown by border regions 521, 522, 523 and 524 in FIG. 29, in order to alter the aspect ratio of the displayed picture to provide a more pleasing composition.

As will be appreciated from the foregoing description, by digitizing and storing film pictures in the manner they have been captured on film, the present invention is able to obviate the need to physically rotate the film scanner relative to the film for vertical pictures, thereby significantly reducing the complexity and cost of the scanner and simplifying the storage mechanism. Instead, the invention takes advantage of the information storage capability of the compact disc database and incorporates an additional presentation control file, so that pictures can be digitized and stored "as is". Since the presentation control file contains orientation and aspect ratio information, the picture playback device will know how each picture has been stored in the database. Subsequently, when the disc is inserted into a playback device for driving an output display such as a color TV monitor, the playback device is readily able to decode the header information in the course of reading out the digitized picture, so that the picture will be displayed in an upright orientation and at the correct aspect ratio for the display.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

I claim:

1. A data base medium on which digitized picture information in the form of a plurality of picture files is stored, wherein each of said picture files includes digital picture data and presentation control information including information related to orientation for a picture generated from the respective digital picture data, said orientation being a respective one of a plurality of different orientations, characterized in that said medium further comprises a separate control file containing respective additional presentation control information for additionally controlling the presentation of pictures from the digital picture data in each of said respective picture files.

* * * * *